United States Patent
Shin et al.

(10) Patent No.: US 11,006,457 B2
(45) Date of Patent: May 11, 2021

(54) METHOD AND APPARATUS FOR PERFORMING COMMUNICATION IN HETEROGENEOUS NETWORK

(71) Applicant: Samsung Electronics Co., Ltd., Suwon-si (KR)

(72) Inventors: Cheolkyu Shin, Suwon-si (KR); Youngwoo Kwak, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/441,822

(22) Filed: Jun. 14, 2019

(65) Prior Publication Data

US 2019/0387547 A1    Dec. 19, 2019

(30) Foreign Application Priority Data

Jun. 15, 2018  (KR) .................. 10-2018-0069264
Sep. 5, 2018   (KR) .................. 10-2018-0106099

(51) Int. Cl.
    *H04W 52/24*    (2009.01)
    *H04W 74/08*    (2009.01)
    *H04W 84/04*    (2009.01)

(52) U.S. Cl.
    CPC ... *H04W 74/0833* (2013.01); *H04W 74/0866* (2013.01); *H04W 84/045* (2013.01)

(58) Field of Classification Search
None
See application file for complete search history.

(56) References Cited

U.S. PATENT DOCUMENTS 9,408,163 B2    8/2016   Han et al.
2015/0296525 A1*  10/2015  Kim .................. H04W 16/10
                                                                          370/329

(Continued)

OTHER PUBLICATIONS

International Search Report dated Sep. 25, 2019, issued in an International application No. PCT/KR2019/007190.

(Continued)

*Primary Examiner* — Ayanah S George
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In accordance with an aspect of the present disclosure, a method of a terminal in a wireless communication system and an apparatus thereof are provided. The method includes identifying at least one of a master information block (MIB) or a system information block (SIB) transmitted from a first base station, identifying a second cell controlled by a second base station for transmitting a random access preamble on a random access channel, and transmitting the random access preamble on the random access channel to the second base station, wherein at least one of the MIB or the SIB includes configuration information on an initial access to the second base station, and wherein configuration information on the initial access to the second base station includes uplink configuration information for the second cell and random access channel configuration information for the second cell.

20 Claims, 30 Drawing Sheets

(56) References Cited

U.S. PATENT DOCUMENTS

2016/0278129 A1  9/2016  Lopez-Perez et al.
2017/0311217 A1* 10/2017  Jung .................... H04W 36/04

OTHER PUBLICATIONS

CATT, 'Random Access Procedure', R2-1706366, 3GPP TSG-RAN WG2 Meeting #NR AH2, See sections 1-2; and figure 1; Jun. 17, 2017; Qingdao, China.
Interdigital, Inc., 'Remaining issues on beam management', R1-1802620, 3GPP TSG RAN WG1 Meeting #92, , See sections 2.1.2, 2.2.3; Feb. 17, 2018; Athens, Greece.

* cited by examiner

REPETITION FOR RECEPTION
BEAM SELECTION (a)

2D antenna port layout ($N_2>1$):

1D antenna port layout ($N_2=1$):

FIG. 26

$$P_{PUSCH,f,c}(i,j,q_d,l) = \min\begin{cases} P_{CMAX,f,c}(i), \\ P_{O\_PUSCH,f,c}(j) + 10\log_{10}(2^\mu \cdot M^{PUSCH}_{RB,f,c}(i)) + \alpha_{f,c}(j) \cdot PL_{f,c}(q_d) + \Delta_{TF,f,c}(i) + f_{f,c}(i,l) \end{cases}$$

- UE/SRS
- Multiple waveforms
- Beam specific control
- Multiple power control processes
- Multiple numerologies

METHOD AND APPARATUS FOR PERFORMING COMMUNICATION IN HETEROGENEOUS NETWORK

CROSS-REFERENCE TO RELATED APPLICATION(S)

This application is based on and claims priority under 35 U.S.C. § 119(a) of a Korean patent application number 10-2018-0069264, filed on Jun. 15, 2018, in the Korean Intellectual Property Office, and of a Korean patent application number 10-2018-0106099, filed on Sep. 5, 2018, in the Korean Intellectual Property Office, the disclosure of each of which is incorporated by reference herein in its entirety.

BACKGROUND

1. Field

The disclosure relates to a wireless communication system. More particularly, the disclosure relates to the operation of a terminal and a base station which is required when the terminal is connected to different base stations for downlink and uplink transmission.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

Heterogeneous network (HetNet) is a network system that off-loads the saturated traffic of a macro cell to reduce the burden of the macro cell by adding low power nodes such as a small cell, a picocell, a nano cell, and the like in a network, to thereby improve the entire performance of the wireless communication system. In this environment, the optimized downlink and uplink coverage may differ depending on the transmission power difference between the base station and the terminal, the difference in the channel characteristics of the link, and the like. Therefore, the user equipment (UE) can be connected to different base stations for uplink and downlink transmission.

The above information is presented as background information only to assist with an understanding of the disclosure. No determination has been made, and no assertion is made, as to whether any of the above might be applicable as prior art with regard to the disclosure.

SUMMARY

When terminals are connected to different base stations for downlink and uplink transmission, unlike an existing base station and a base station that performs downlink and uplink transmission and reception simultaneously with one base station, such terminals and base stations require different operations in various aspects such as initial connection, transmission power control, and data transmission.

Aspects of the disclosure are to address at least the above-mentioned problems and/or disadvantages and to provide at least the advantages described below. Accordingly, an aspect of the disclosure is to provide a method of receiving and transmitting data by searching for another uplink and downlink cell from an initial connection of a terminal and a base station, and a method of receiving and transmitting uplink and downlink data assuming a plurality of cells in general data transmission.

Additional aspects will be set forth in part in the description which follows and, in part, will be apparent from the description, or may be learned by practice of the presented embodiments.

In accordance with an aspect of the disclosure, a method of a terminal in a wireless communication system is provided. The method includes identifying at least one of a master information block (MIB) or a system information block (SIB) transmitted from a first base station, identifying a second cell controlled by a second base station for transmitting a random access preamble on a random access channel, and transmitting the random access preamble on the random access channel to the second base station, wherein at least one of the MIB or the SIB includes configuration information on an initial access to the second base station, and wherein configuration information on the initial access to the second base station includes uplink configuration information for the second cell and random access channel configuration information for the second cell.

In accordance with another aspect of the disclosure, a method of a first base station in a wireless communication system is provided. The method includes identifying a second cell controlled by a second base station for transmitting a random access preamble on a random access channel by a terminal, and transmitting a master information block (MIB) or a system information block (SIB) to the terminal, wherein at least one of the MIB or the SIB includes configuration information on an initial access to the second base station, and wherein configuration information on the initial access to the second base station includes uplink configuration information for the second cell and random access channel configuration information for the second cell.

In accordance with another aspect of the disclosure, a terminal in a wireless communication system is provided. The terminal includes a transceiver and at least one processor coupled with the transceiver. The at least one processor is configured to identify at least one of a master information block (MIB) or a system information block (SIB) transmitted from a first base station, identify a second cell controlled by a second base station for transmitting a random access preamble on a random access channel, and transmit the random access preamble on the random access channel to the second base station, wherein at least one of the MIB or the SIB includes configuration information on an initial access to the second base station, and wherein configuration information on the initial access to the second base station includes uplink configuration information for the second cell and random access channel configuration information for the second cell.

In accordance with another aspect of the disclosure, a first base station in a wireless communication system is provided. The first base station includes a transceiver and at least one processor coupled with the transceiver. The at least one processor is configured to identify a second cell controlled by a second base station for transmitting a random access preamble on a random access channel by a terminal, and transmit a master information block (MIB) or a system information block (SIB) to the terminal, wherein at least one of the MIB or the SIB includes configuration information on an initial access to the second base station, and wherein the configuration information on the initial access to the second base station includes uplink configuration information for the second cell and random access channel configuration information for the second cell.

As described above, according to the disclosure, a method of effectively performing initial connection and data transmission/reception when a user equipment (UE) is connected to different base stations for uplink/downlink transmission is disclosed. Through this, overall system performance of a heterogeneous network (HETNET) may be improved, costs may be reduced by utilizing a femtocell or a picocell with lower installation and maintenance costs, and data may be transmitted to an adjacent cell at the time of uplink transmission, whereby there is an effect that the transmission power of the terminal can be reduced and the battery power consumption of the terminal can also be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 26 illustrates an equation for uplink power control according to an embodiment of the disclosure.

Throughout the drawings, it should be noted that like reference numbers are used to depict the same or similar elements, features, and structures.

DETAILED DESCRIPTION

Figure 1:
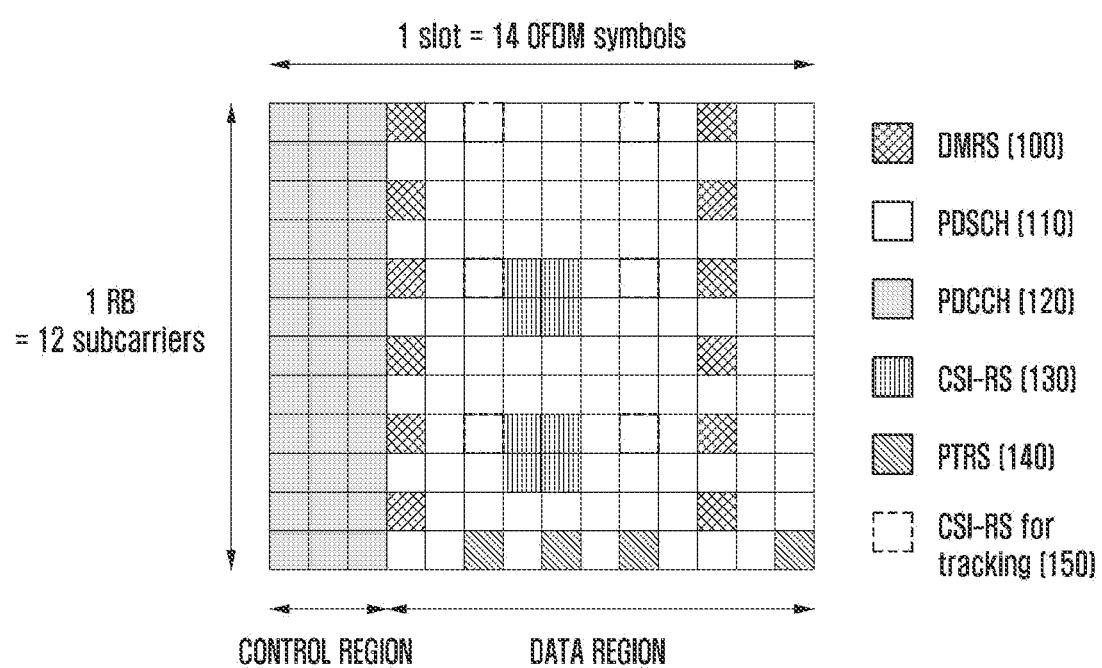
FIG. 1 illustrates a downlink scheduling radio resource according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

From the early stage of providing voice-oriented services, a mobile communication system has evolved into a high-speed and high-quality wireless packet data communication system to provide data and multimedia services. To this end, the 3rd generation advanced mobile communication system by employing a multiple access scheme using multi-carriers is in the process of standardization by many standardization organizations, such as 3rd generation partnership project (3GPP), 3rd generation partnership project 2 (3GPP2), institute of electrical and electronics engineers (IEEE), etc. In recent years, various mobile communication standards, such as long term evolution (LTE) of 3GPP, ultra mobile broadband (UMB) of 3GPP2, 802.16m IEEE, etc., have been developed to support a high quality and high speed wireless packet data transmission service on high quality and high speed, based on a multiple access scheme using multi-carriers.

The existing 3rd generation advanced mobile communication system, such as LTE, UMB, 802.16m, etc., have employed, based on a multi-carrier multiple access scheme, various technologies, such as multiple input multiple output (MIMO) to improve the transmission efficiency, beam-forming, adaptive modulation and coding (AMC), channel sensitive scheduling method, etc.

These technologies employ techniques that focus on transmission power via a number of antennas or adjust an amount of transmission data, depending on the channel quality, etc., and selectively transmit data to users of high channel quality, thereby improving the transmission efficiency and the system throughput. Since most of these techniques are used based on channel quality information between a base station (can be mixed with evolved Node B (eNB) or base station (BS)) and a terminal (can be mixed with user equipment (UE) or mobile station (MS)), the eNB or UE needs to measure the channel quality between eNB and UE. To measure the channel quality, channel status indication reference signal (CSI-RS) is used. The eNB described above refers to a downlink transmitter and an uplink receiver located in a specified place. One eNB performs the transmission/reception for a number of cells. One mobile communication system includes a number of eNBs geographically distributed in an area, each of which performs the transmission/reception for a number of cells.

The 3rd-generation (3G) and 4th-generation (4G) mobile communication systems of the related art, such as an LTE/LTE-advanced (LTE-A) system, adopt MIMO technology to improve the data rate and system throughput. The MIMO technique includes transmitting a plurality of information streams separated spatially using multiple transmit/receive antennas. This technique of transmitting spatially separated multiple information streams is referred to as spatial multiplexing. Typically, the number of information streams for spatial multiplexing is determined depending on the numbers of transmit and receive antennas. Typically, the number of information streams that can be spatially multiplexed is referred to as a rank of the corresponding transmission. In the MIMO technique supported by standards up to the LTE/LTE-A Release 11, spatial multiplexing for 16 transmission antennas and 8 reception antennas is supported and up to 8 ranks are supported.

New radio access technology (NR), a 5th-generation (5G) mobile communication system currently being discussed has a design purpose of a system to support various services such as enhanced mobile broadband (eMBB), massive machine type communications (mMTC), ultra-reliable and low-latency communications (URLLC), and the like. For this purpose, the NR minimizes the always-on reference signal and makes it possible to use the time and frequency resources flexibly by allowing the reference signal to be transmitted aperiodically.

Hereinafter, embodiments of the disclosure will be described in detail with reference to the accompanying drawings.

In describing the various embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and methods of achieving the same will be apparent by referring to embodiments of the disclosure as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more central processing units (CPUs) within a device or a security multimedia card.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, in the specification, an embodiment will be described using an NR system, an LTE system, and an LTE-A system as examples, but the disclosure can be applied to similar communication systems without any addition and subtraction.

In this specification, higher layer signaling is a signal transmission method in which signals such as radio resource control (RRC) signaling, packet data convergence protocol (PDCP) signaling, medium access control control element (MAC CE), etc., are transmitted from a base station to a UE using a downlink data channel (e.g., physical downlink shared channel (PDSCH)) of a physical layer or are transmitted from a UE to a base station using an uplink data channel (e.g., physical uplink shared channel (PUSCH)) of a physical layer.

FIG. 1 illustrates radio resources of one subframe or slot and one resource block (RB), which are minimum units that can be downlink-scheduled in a mobile communication system according to an embodiment of the disclosure.

Referring to FIG. 1, the radio resource is composed of one RB on the frequency axis and one subframe (or it can be referred to as a "slot") on the time axis. This radio resource is composed of 12 subcarriers (which can be mixed with subcarriers) in the frequency domain and 14 orthogonal frequency division multiplexing (OFDM) symbols in the time domain, and thus has 168 natural frequency and time positions. In NR, as in LTE and LTE-A, each natural frequency and time position in FIG. 1 is referred to as a resource element (RE).

A plurality of different types of signals may be transmitted to the radio resource shown in FIG. 1.

1. Demodulation reference signal (DMRS) 100: This is a reference signal transmitted for a specific UE and is transmitted only when data is transmitted to a corresponding UE. In an LTE-A system, the DMRS can be composed of a total of eight DMRS antenna ports (hereinafter, mixed with ports). In the LTE-A, ports 7 to 14 correspond to the DMRS ports, and the ports maintain orthogonality so that they do not interfere with each other using code division multiplexing (CDM) or frequency division multiplexing (FDM).

2. Physical downlink shared channel (PDSCH) 110: This is a data channel transmitted in downlink, used for a base station to transmit traffic to a UE, and transmits the traffic using an RE to which a reference signal is not transmitted in a data region of FIG. 1.

3. Physical downlink control channel (PDCCH) 120: This is a control channel transmitted in downlink, and is a channel in which a base station indicates, to a UE, a variety of control information such as resource allocation for scheduling a PDSCH or a physical uplink shared channel (PUSCH), modulation and coding scheme (MCS), redundancy version (RV), precoding resource block group (PRG), and the like.

4. Channel state information reference signal (CSI-RS) 130: This is a reference signal transmitted for UEs belonging to one cell, and is used to measure a channel status. A plurality of CSI-RSs can be transmitted to one cell. In LTE, the CSI-RSs are transmitted in time and frequency resources by using a predetermined pattern of a specific position, whereas in NR, the CSI-RSs are synchronized and used in free time and frequency positions with respect to (2, 1), (2, 2), (4, 1) unit RE patterns on the basis of frequency and time.

5. Phase tracking reference signal (PTRS) 140: This is a reference signal for estimating a phase that is rapidly changed in a high frequency band (for example, 28 GHz) of 6 GHz or more, and can configure a position offset and a density. The use of the PTRS can be dynamically and indirectly indicated using MCS.

6. CSI-RS for tracking 150: There is a lack of a reference signal for synchronizing time and frequency in addition to a synchronization signal block (SSB) and a physical broadcast channel (PBCH) DMRS in accordance with the absence of cell specific RS (CRS) supported by LTE, so that RSs for such synchronization can be further allocated. Specifically, whether the corresponding CSI-RS is used for tracking within a CSI-RS set on the basis of the CSI-RS can be configured using RRC.

In addition to the above signals, an NR system can configure a zero power (ZP) CSI-RS for muting so that the CSI-RS transmitted by another base station can be received at UEs of the corresponding cell without interference. The ZP CSI-RS can be applied at a position where the CSI-RS can be transmitted. In general, a UE receives a traffic signal by skipping the radio resource, and the transmission power is not transmitted.

In addition, the UE may be allocated with CSI-IM (or interference measurement resources (IMR)) together with the CSI-RS. In the CSI-IM resources, resources (4,1) or (2,2) can be configured in higher layer signaling on the basis of frequency and time. Such CSI-IM is a resource for allowing a UE to measure interference received when the UE receives a PDSCH. For example, when it is desired to measure the amount of interference when an adjacent base station transmits data and the amount of interference when the adjacent base station does not transmit data, the corresponding base station configures a CSI-RS and two CSI-IM resources. Here, one CSI-IM may cause the adjacent base station to always transmit a signal and the other CSI-IM may prevent the adjacent base station from always transmitting a signal, thereby effectively measuring the amount of interference of the adjacent base station.

In the case of the LTE-A system, a UE feeds back information on the channel status of the downlink to a base station so that the corresponding can be utilized for downlink scheduling of the base station. That is, the UE measures a reference signal transmitted from the base station in the downlink, and feeds information obtained by extracting the measured reference signal to the base station in a form defined by LTE and LTE-A standards. There are the following three types of information that the UE feeds back in LTE and LTE-A:

Rank indicator (RI): Number of spatial layers that UE can receive in current channel state.

Precoder matrix indicator (PMI): Indicator of UE's preferred precoding matrix in current channel status Channel quality indicator (CQI): Maximum data rate that UE can receive in current channel status. The CQI can be replaced by a signal-to-interference-plus-noise ratio (SINR) that can be utilized in a similar manner to a maximum data rate, a maximum error correction code rate and a modulation scheme, data efficiency per frequency, etc.

The RI, PMI, and CQI are related to each other and have a meaning. For example, the precoding matrices supported by LTE and LTE-A are defined differently for each rank. Therefore, a PMI value when the RI has a value of 1 and a PMI value when the RI has a value of 2 are interpreted differently even if their values are the same. Also, when the UE determines the CQI, it is assumed that a rank value and a PMI value which are notified to the base station by the UE are applied in the base station. That is, in a case in which RI_X, PMI_Y, and CQI_Z are notified to the base station by the UE, when a rank is RI_X and a PMI is PMI_Y, it means that the UE can receive the data rate corresponding to CQI_Z. In this way, when the CQI is calculated, the UE assumes which transmission scheme the base station will perform, so that optimized performance can be obtained when actual transmission is performed according to the corresponding transmission scheme.

Figure 2:
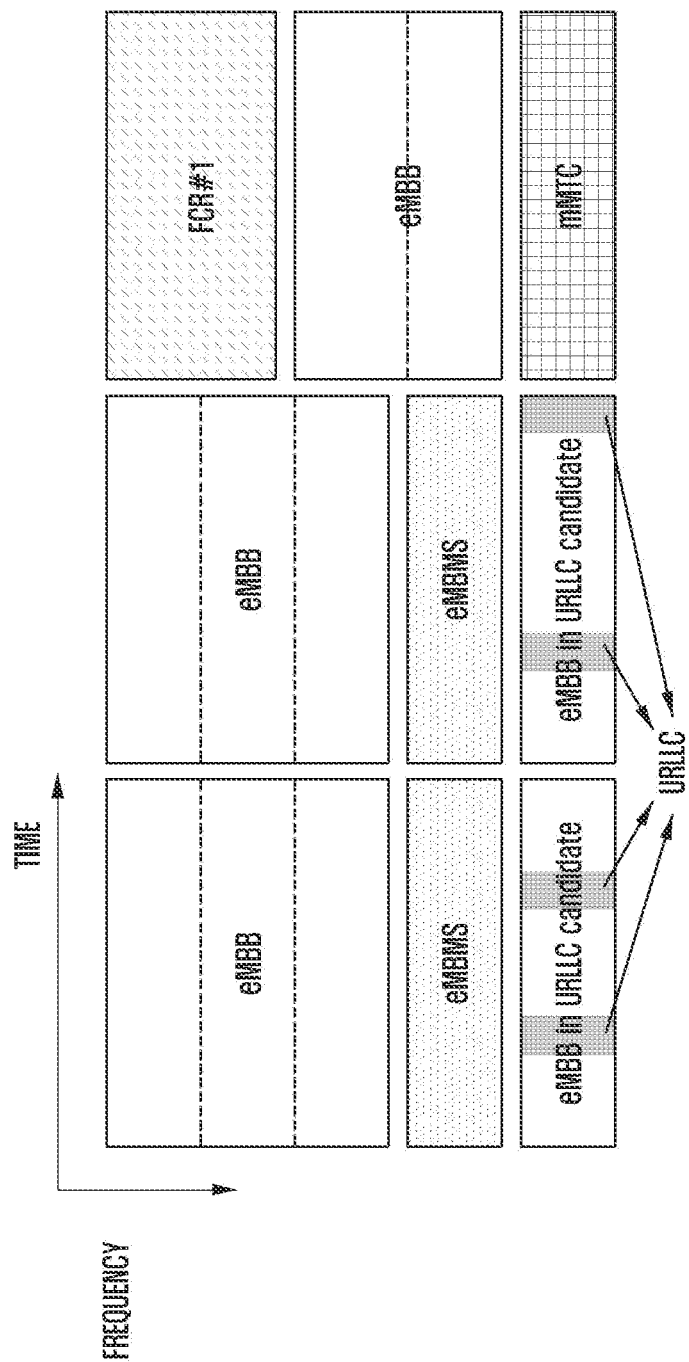
FIG. 2 is a diagram illustrating an example in which data of a service considered in a new radio access technology (NR) system is allocated in a frequency-time resource according to an embodiment of the disclosure.

FIG. 2 is a diagram illustrating an example in which data such as eMBB, URLLC, mMTC, and the like which are services considered in an NR system is allocated in a frequency-time resource together with forward compatible resource (FCR) according to an embodiment of the disclosure.

If URLLC data is generated while eMBB and mMTC are allocated and transmitted in a specific frequency band and transmission of the URLLC data is required, a transmitter empties a pre-allocated portion of eMBB and mMTC data and transmits the URLLC data. Since a short delay time is particularly important in the URLLC among the above services, the URLLC data can be allocated to a portion of resource allocated with eMBB and transmitted, and such eMBB resource can be informed to the UE in advance. To this end, the eMBB data may not be transmitted in the frequency-time resource where the eMBB data and the URLLC data overlap, and thus the transmission performance of the eMBB data may be lowered. That is, in the above case, an eMBB data transmission failure due to the URLLC allocation may occur. At this time, the length of transmission time interval (TTI) used for the URLLC transmission may be shorter than the length of TTI used for the eMBB or mMTC transmission.

A synchronization signal is used to acquire synchronization with a cell in a network in a process of a UE accessing a wireless communication system. More specifically, the synchronization signal refers to a reference signal transmitted by the base station for time and frequency synchronization and cell search at the time of an initial connection of the UE. In LTE, a signal such as a primary synchronization signal (PSS) and a secondary synchronization signal (SSS) may be transmitted for synchronization. In addition, in order to acquire synchronization with a cell through a cell search procedure and to access the cell, cell system information should be acquired and system information below can be transmitted through the PBCH and the PDSCH.

At this time, the synchronization signal and the PBCH are transmitted at regular intervals in the time axis, and can be transmitted within a constant transmission bandwidth in the frequency axis. A special sequence may be mapped to a subcarrier within the transmission bandwidth so that the synchronization signal indicates a cell identifier (ID), and the cell number may be mapped in a combination of one or a plurality of sequences. Thus, the UE can detect the cell number to which the UE desires to connect by detecting the sequence used for the synchronization signal.

Figure 3:
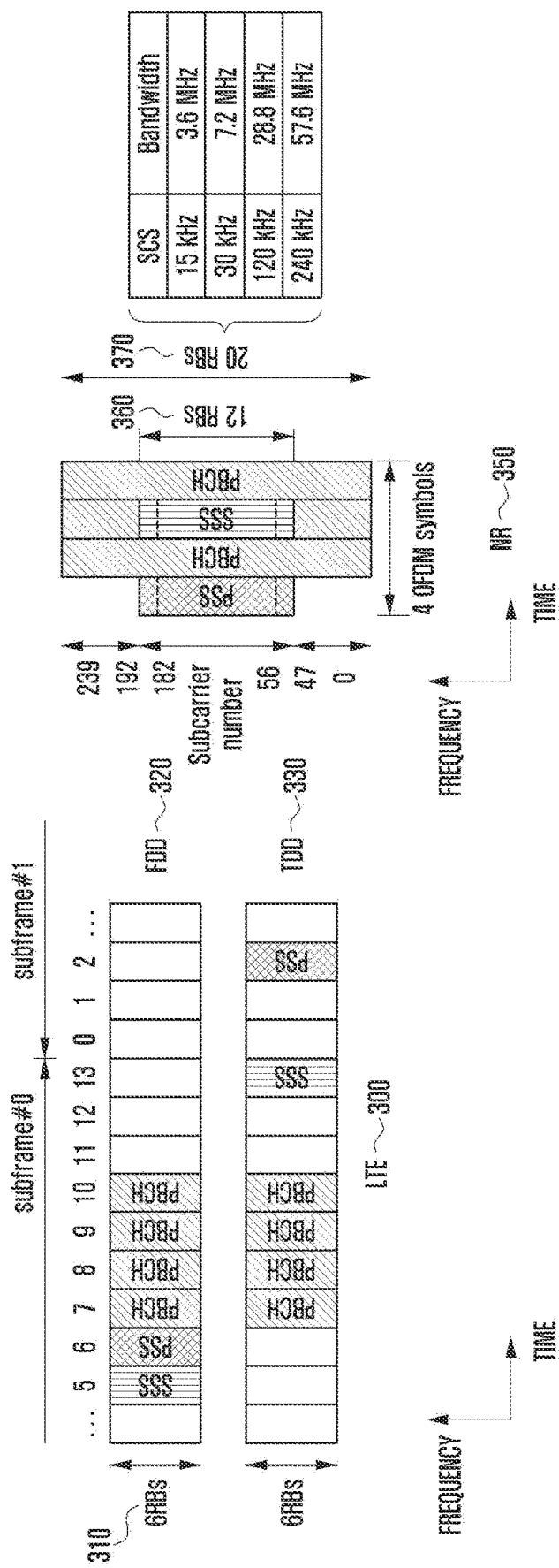
FIG. 3 is a diagram illustrating a diagram illustrating structures of a synchronization signal and a physical broadcast channel (PBCH) transmitted in long term evolution (LTE) and NR, according to an embodiment of the disclosure.

FIG. 3 is a diagram illustrating structures of a synchronization signal and a PBCH transmitted in LTE and NR, which are considered according to an embodiment of the disclosure. Table 1 below is a table comparing channel structures of SS/PBCH blocks of LTE and NR.

TABLE 1

| LTE | | NR |
|---|---|---|
| Single | # SS/PBCH blocks | Multiple (per band) |
| 6 PRBs | SS/PBCH block bandwidth | 20 PRBs |
| 1 | # Symbol for PSS | 1 |
| 1 | # Symbol for SSS | 1 |
| 4 for SF #0 | # Symbol for PBCH | 2 + 1 multiplexed with SSS |
| 62 + 10 empty | # REs for PSS | 127 + 17 empty |
| 62 + 10 empty | # REs for SSS | 127 + 17 empty |
| 240 | # REs for PBCH | 432 |
| 48 | # REs for RS | 144 (Density: 3 REs/RB/Symbol) |
| Different | TDD vs FDD | Unified |

Referring to FIG. 3, as shown in Table 1, in an LTE 300, a PSS, an SSS, and a PBCH are transmitted using the same frequency resource (6 PRBs, 310) on the frequency axis. However, in an NR 350, the amount of resources occupied on the frequency is 12 PRBs (360) for the PSS and the SSS and the amount thereof is 20 PRBs (370) for the PBCH, which are different from each other. In addition, the LTE 300, and a TDD 330 and an FDD 320 have different transmission positions, but the NR 350, and the TDD and the FDD all have the same transmission position.

Table 2 below compares PSS sequences in the LTE and the NR.

TABLE 2

| LTE | | NR |
|---|---|---|
| ZC-sequence | Sequence Type | M-sequence |
| 63 | Sequence Length | 127 |
| 3 | # Sequences | 3 |
| 3 root indices of ZC-sequences | How to Represent Cell ID Info | 3 cyclic shifts of single M-sequence |
| No modulation | Modulation | BPSK |
| DC subcarrier is truncated (62 REs) | Mapping to REs | DC subcarrier is not truncated (127 REs) |

As mentioned in the above Table 2, in the LTE, the PSS uses a Zadoff-Chu sequence having a constant amplitude zero auto correlation (CAZAC) characteristic. However, in the NR, an M-sequence which is a pseudo random sequence is used. The LTE and the NR are the same in that they support three sequences.

Table 3 below compares SSS sequences in the LTE and the NR.

TABLE 3

| LTE | | NR |
|---|---|---|
| M-sequence | Sequence Type | Gold-sequence (XOR of 2 M-sequences) |
| 31 | Sequence Length | 127 |
| Cell ID and half radio frame timing (504*2) | Carried Info (# sequences) | Cell ID only (1008) |
| Interleaved two M-sequences, where each M-sequence carries part of the cell ID info, and a further scrambling carries the half radio frame timing | Construction Method | Each of the M-sequences carries part of the cell ID info |
| BPSK | Modulation | BPSK |
| DC subcarrier is truncated (62 REs) | Mapping to REs | DC subcarrier is not truncated (127 REs) |

As mentioned in the above Table 3, unlike the LTE, which uses an M-sequence of the length of 31, the NR supports SSS through a gold sequence of length of 127. In the LTE, a PSS is generated using three Zadoff-Chu sequences as described above, and an SSS is generated using an M-sequence. In this case, the PSS of one cell may have three different values according to a physical layer cell ID of the cell, and the three cell IDs of one cell ID group correspond to different PSSs. Accordingly, the UE detects the PSS of the cell and can identify one of the three cell ID groups supported by the LTE. The UE additionally detects an SSS among 168 cell IDs reduced from 504 cell IDs through the cell ID group identified through the PSS, thereby finally knowing the cell ID to which the corresponding cell belongs.

In the NR, the UE identifies three cell ID groups through the PSS based on the M-sequence and detects 336 cell ID groups using the SSS based on the gold sequence, thereby finally detecting one cell ID among 1008 cell IDs.

Next, as to PBCH transmission, the PBCH transmission in the NR has many differences in the channel coding and the reference signal with the LTE. Table 4 below compares a difference in the PBCH transmission between the LTE and the NR.

TABLE 4

| LTE | | NR |
|---|---|---|
| Tail-Biting Convolutional Code (TBCC) | Channel coding | Polar codes, same as PDCCH |
| QPSK | Modulation | QPSK |
| Frequency-first, time-second | Resource mapping | Frequency-first, time-second |
| 1/2/4 ports (UE blind detection with CRC mask) | Transmission scheme | 1 port, and same as SSS |
| 40 ms | TTI | 80 ms |

As shown in the above Table 4, in the LTE, the PBCH is transmitted every 40 ms based on TBCC, but in the NR, the PBCH is transmitted every 80 ms using a polar code. In this case, unlike in the LTE where channel estimation is performed on PBCH using CRS, the NR estimates a channel for PBCH decoding using PBCH DMRS.

In the NR, the above-mentioned PSS, SSS and PBCH are combined and called SS blocks (which can be mixed with SSB, SS/PBCH, SS/PBCH block, etc.). The NR system allows the SS and PBCH to be transmitted using different beams by allowing transmission of these multiple SS blocks.

Figure 4:
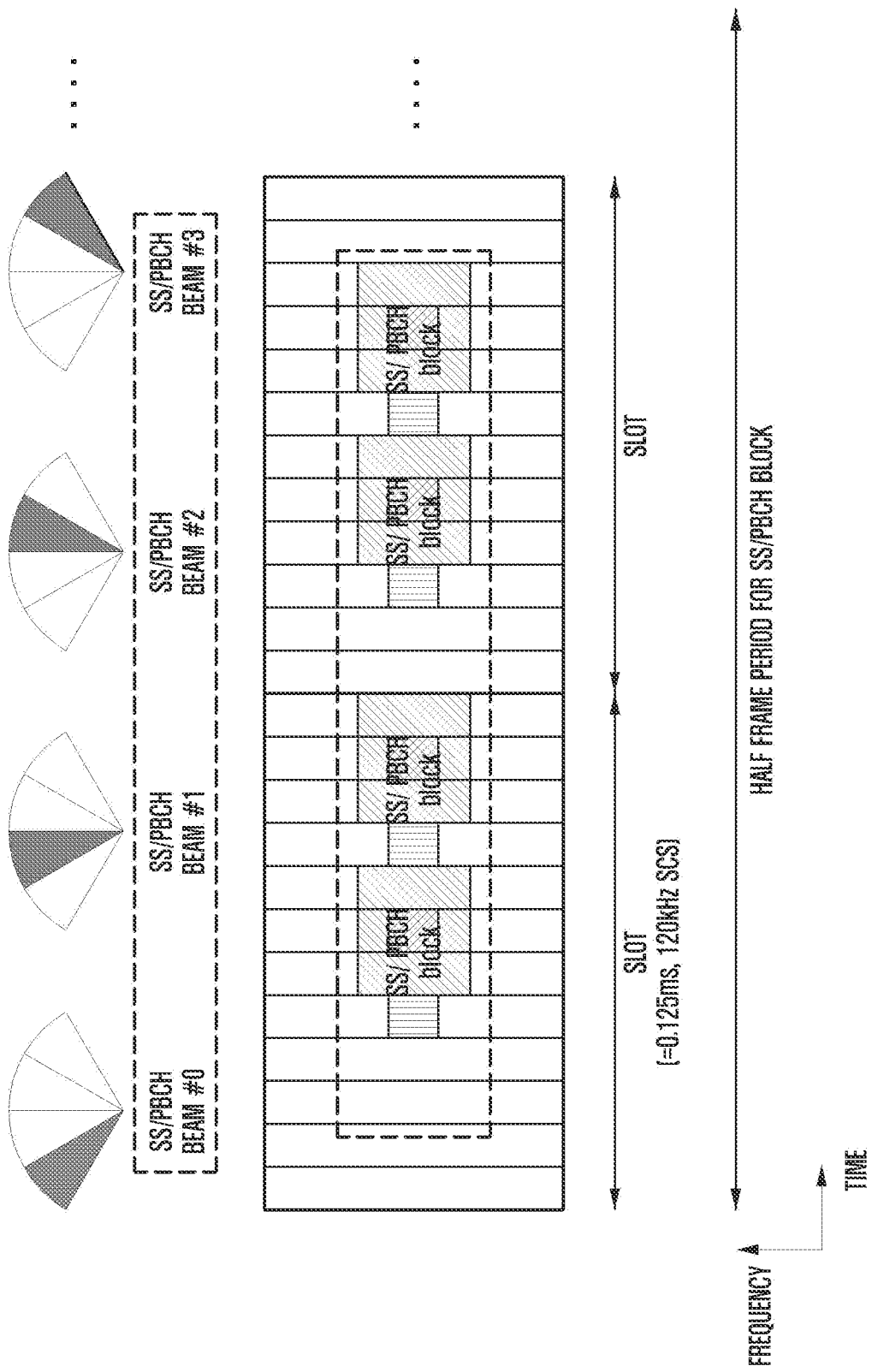
FIG. 4 is a diagram illustrating an example in which a plurality of SS blocks are transmitted using different beams according to an embodiment of the disclosure.

FIG. 4 is a diagram illustrating an example in which a plurality of SS blocks are transmitted using different beams according to an embodiment of the disclosure.

Referring to FIG. 4, the SS block in the NR is composed of PSS, SSS, and PBCH, and a plurality of SS blocks can be transmitted to a UE. At this time, each of the SS blocks may be transmitted to the UE using a different beam. For example, the SS blocks shown in FIG. 4 are transmitted using beams #0, #1, #2, and #3, respectively.

Information transmitted through the PBCH in the SS block is also changed in comparison with the LTE. Table 5 below compares master information block (MIB) information transmitted through the PBCH in the LTE and NR.

TABLE 5

| LTE | | NR |
|---|---|---|
| 3 bits | Channel bandwidth | |
| 3 bits | PHICH configuration | |
| 8 LSBs of SFN | System Frame Number (SFN) | 10 bits of SFN |
| | MSB of SS/PBCH block index | 3 bits (>6 GHz) |
| | Half frame timing | 1 bit |
| | Subcarrier spacing for common control | 1 bit |
| | SS/PBCH subcarrier offset | 4 bits + 1 bit (<6 GHz) |
| | DMRS Type A position for PDSCH | 1 bit |
| | SIB1 PDCCH configuration | 8 bits |
| | Cell barring info | 2 bits + 1 bit reserved |
| 10 bits | Spare | 1 bit (>6 GHz), 2 bits (<6 GHz) |
| 16 bits | CRC | 24 bits |
| 40 bits | Total payload size | 56 bits |

In order to transmit the above information, the base station encodes the MIB and transmits the encoded MIB on the PBCH.

As shown in Table 5, in the PBCH of the NR, the channel bandwidth and PHICH configuration-related information supported by the LTE are disappeared. However, various information such as a most significant bit (MSB) of an SS/PBCH block index, half frame timing, a subcarrier spacing for common control, SS/PBCH subcarrier offset, and the like are added. In particular, the MSB of the SS/PBCH block index provides MSB information of the SS block index for supporting a plurality of SS blocks, so that a plurality of SS blocks can be transmitted. The UE transmits beam-based physical random-access channel (PRACH) to the base station using PRACH resources allocated for each SS block through the acquisition of the SS block index, so that a random access procedure necessary for initial connection can be performed.

Figure 5:
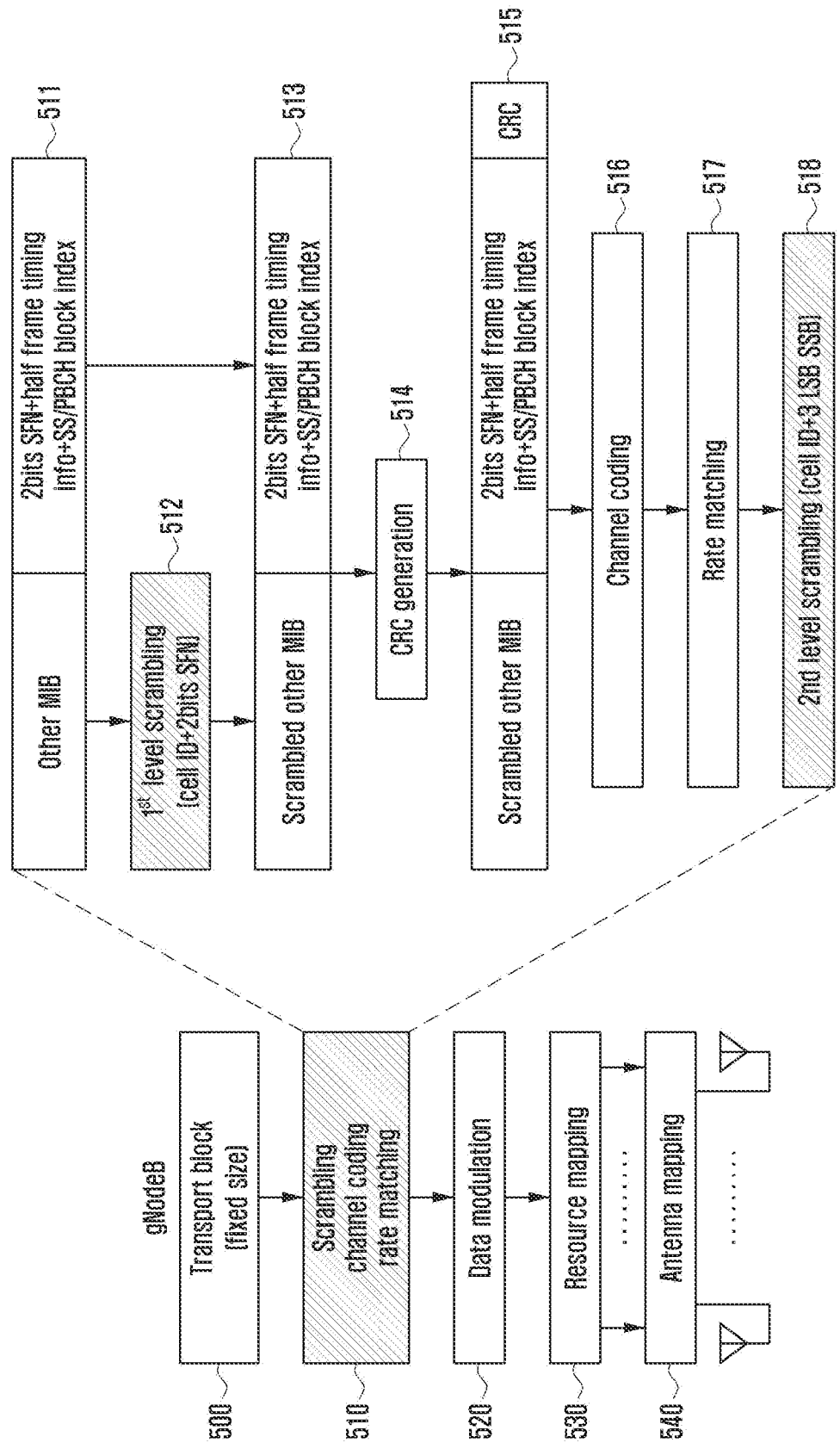
FIG. 5 illustrates a procedure for a base station to encode a master information block (MIB) to transmit the MIB to a PBCH according to an embodiment of the disclosure.

FIG. 5 illustrates a procedure for a base station to encode an MIB to transmit the MIB to a PBCH according to an embodiment of the disclosure.

Referring to FIG. 5, a base station (gNode B) performs scrambling, channel coding, and rate matching based on a transport block 500 of a fixed size in operation 510. Specifically, in operation 510, 2-bit system frame number (SFN), half frame timing information, and SS block index information are added to MIB information in operation 511. Next, the MIB information is scrambled on the basis of a cell ID and the 2-bit SFN in operation 512, and the scrambled MIB information, 2-bit SFN, half frame timing information, and SS block index information are generated in operation 513. Next, 24-bit cyclic redundancy check (CRC) is generated based on the above information in operation 514 and is added to the above information in operation 515. Next, the above information is channel-coded in operation 516, rate-matched in operation 517, and re-scrambled based on 3-bit least significant bits (LSB) of the cell ID and SSB index in operation 518. Next, the scrambled information is demodulated in operation 520, mapped to resources in operation 530, and mapped to antennas and transmitted in operations 530 and 540.

Figure 6:
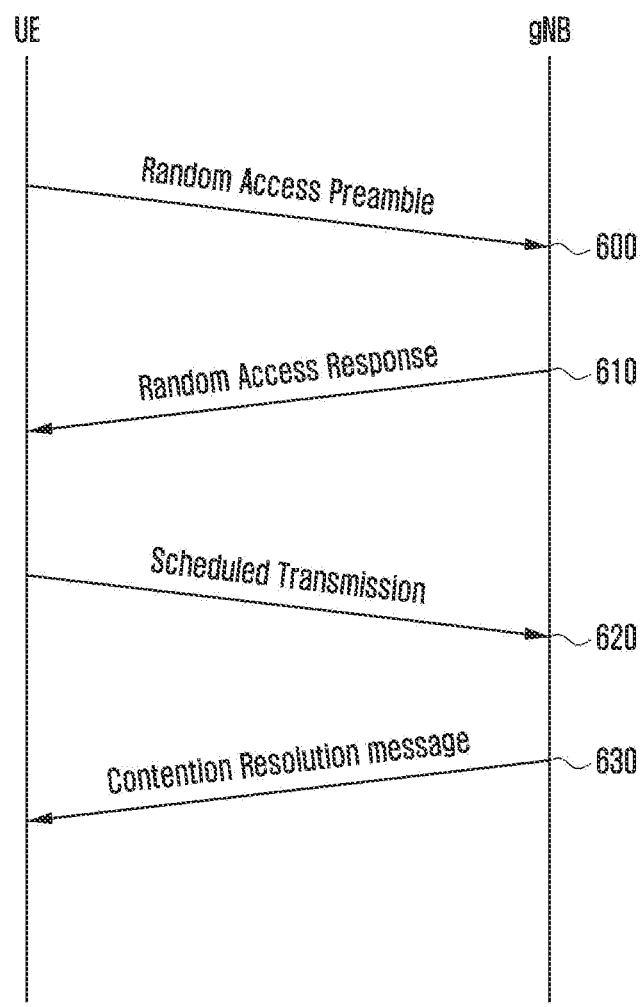
FIG. 6 illustrates a random-access procedure of a user equipment (UE) according to an embodiment of the disclosure.

FIG. 6 illustrates a random access procedure of a UE according to an embodiment of the disclosure.

Referring to FIG. 6, a UE can detect a synchronization signal in the above-mentioned SS block and decode a PBCH. In operation 600, based on a preamble format and time and frequency resources identified based on the result reported in this manner, the UE may transmit a random-access preamble (hereinafter, can be mixed with Msg1) through PRACH. After receiving the Msg1, a base station transmits a PDCCH for the transmission of Msg2 (hereinafter, can be mixed with a random-access response (RAR)) to the terminal, and transmits the Msg2 to the resource allocated via the PDCCH through a PDSCH in operation 610. Next, in operation 620, the UE transmits Msg3 (which can be mixed with a scheduled transmission) to the base station to inform the base station that the UE has successfully received the Msg2. Next, in operation 630, the base station transmits a contention resolution message on the PDSCH to indicate that the contention has been resolved.

Unlike the LTE, the NR can support more flexible channel status reporting configuration than the LTE through resource setting, channel measurement configuration, and channel status reporting configuration, which are required to support channel status information reporting.

Figure 7:
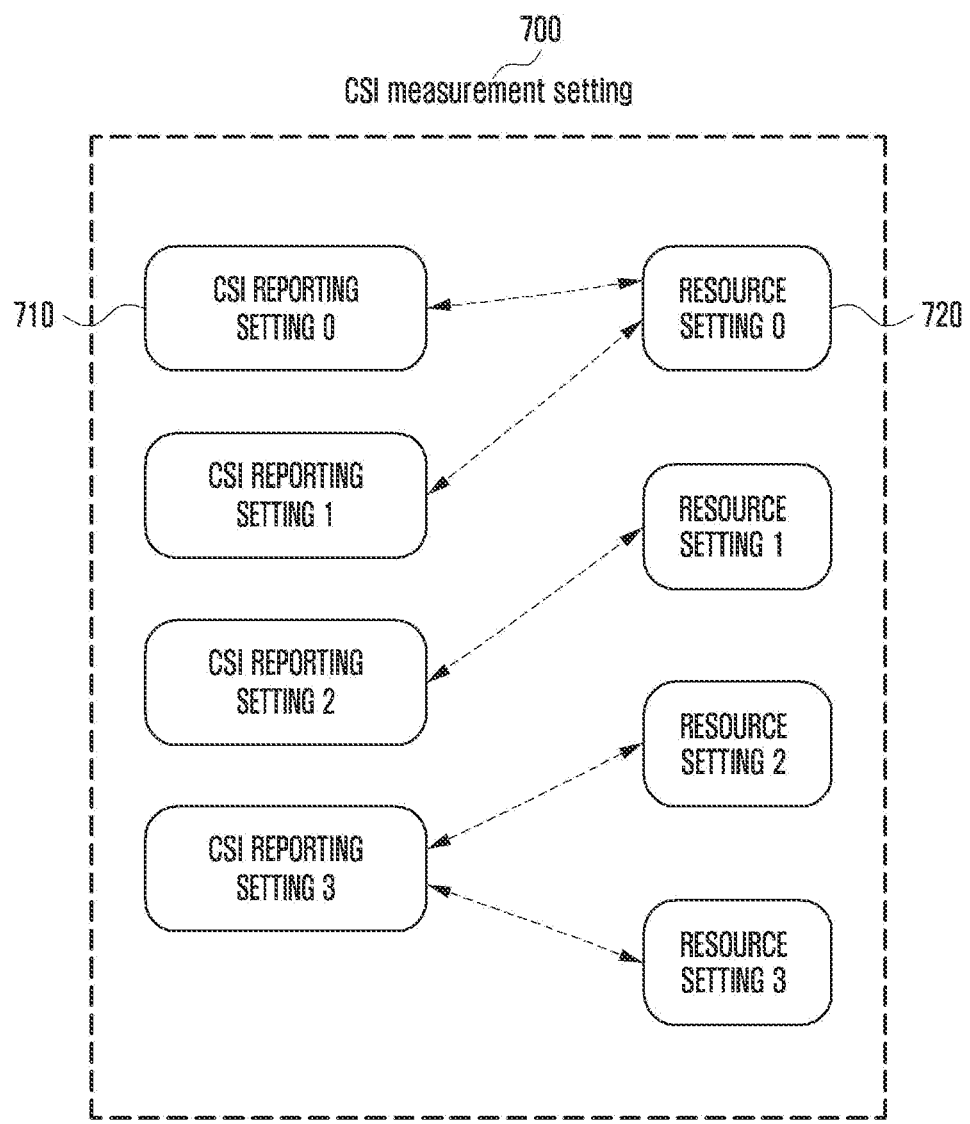
FIG. 7 is a diagram illustrating resource setting, channel status indication (CSI) measurement setting, and CSI reporting setting which are required to support CSI reporting in NR according to an embodiment of the disclosure.

FIG. 7 is a diagram illustrating resource setting, CSI measurement setting, and CSI reporting setting which are required to support CSI reporting in NR according to an embodiment of the disclosure. The resource setting, the CSI measurement setting, and the CSI reporting setting may include the following setting information.

CSI reporting setting 710: turning-on and -off of reporting parameters (e.g., RI, PMI, CQI, etc.) required for channel status reporting can be set. It is possible to set the type of channel status reporting (e.g., type 1 {Type I, implicit reporting type as channel status reporting having a low resolution} or type 2 {Type II, a type in which eigenvector, covariance matrix, and the like are explicitly reported using channel status reporting of a linear combination type as channel status reporting having a high resolution}). Specifically, it is possible to support CSI reporting setting (whether to report CSI reporting setting {RI, PMI, CQI, beam indicator (BI)} or a CSI-RS resource indicator (CRI) can be set in separate setting or combined setting), reporting method (aperiodic and semi-persistent as one among periodic, aperiodic, and semi-persistent can be set as one parameter), codebook setting information, PMI type (wideband or partial band), channel status reporting type (indirect or direct, or Type I or Type II), channel quality reporting type (CQI or RSRP), and resource setting for channel status reporting.

Resource setting 720: This is setting including setting information for a reference signal required for channel state measurement. CSI-RS resources for channel and interference measurement and CSI-IM resources for interference measurement may be configured through the resource setting. To this end, a plurality of resource settings may exist. Also, the transmission type (periodic, aperiodic, and semi-persistent) of the corresponding reference signal, transmission period and offset of the reference signal, and the like can be configured.

CSI measurement setting 700: This establishes mapping or connection between CSI reporting setting and resource setting. For example, if there are N CSI reporting settings and M resource settings, L links establishing mapping between these multiple CSI reporting settings and resource settings may be included in the CSI measurement setting. In addition, an association setting between the reference signal setting and the reporting point can also be configured.

The NR supports semi-persistent reference signal transmission and channel status information in addition to periodic and aperiodic channel status reporting supported by the LTE. Table 6 below shows parameters configured in the CSI reporting setting (CSI Report Config).

reportFreqConfiguration, frequency-related parameters used in the CSI reporting are included. cqi-FormatIndicator is configuration for reporting either a wideband CQI or a subband CQI, and pmi-FormatIndicator is configuration for reporting either a wideband PMI or a subband PMI.

Unlike that the LTE supports reporting modes for periodic or aperiodic reporting modes, the NR configures whether a PMI is a wideband PMI or a subband PMI in the CSI reporting setting as shown in the above Table 6 or whether a CQI is a wideband CQI or a subband CQI. In addition, csi-ReportingBand is configuration for what subband should be reported among the entire subband.

Since semi-persistent CSI reporting in the NR supports dynamic activation and deactivation in comparison with periodic CSI reporting, it requires relatively high UE complexity. However, physical uplink control channel (PUCCH) and PUSCH resources required for CSI reporting can be effectively used using such dynamic activation and deactivation operations.

In addition, periodic channel state information of the NR may not support the above-described subband reporting (subband CQI or subband PMI). In the case of the PUCCH used in the periodic CSI reporting, the amount of reporting that can be transmitted is limited. Accordingly, in the LTE,

TABLE 6

| Parameter name | Description | Value range |
|---|---|---|
| CSI-ReportConfigId | Report config ID | |
| ServCellIndex | Report serving cell ID | |
| resourcesForChannelMeasurement | NZP CSI-RS resource config ID for channel measurement | |
| csi-IM-ResourcesForInterference | CSI-IM resource config ID for interference measurement | |
| nzp-CSI-RS-ResourcesForInterference | NZP CSI-RS resource config ID for interference measurement | |
| reportConfigType | Transmission type of CSI reporting | periodic, semiPersistentOnPUCCH, semiPersistentOnPUSCH, aperiodic |
| reportQuantity | CSI parameters to be reported | none, cri-RI-PMI-CQI, cri-RI-i1, cri-RI-i1-CQI, cri-RI-CQI, cri-RSRP, ssb-Index-RSRP, cri-RI-LI-PMI-CQI |
| reportFreqConfiguration | Reporting configuration on frequency domain | |
| cqi-FormatIndicator | CQI format | wideband CQI, subband CQI |
| pmi-FormatIndicator | PMI format | wideband PMI, subband PMI |
| csi-ReportingBand | CSI reporting band configuration | |

In the above, CSI-ReportConfigId is for configuring an ID of the corresponding CSI reporting setting, and ServCellIndex denotes an ID of a cell for reporting the corresponding CSI reporting, resourcesForChannelMeasurement denotes NZP CSI-RS setting for measuring a signal channel used for CSI reporting, and csi-IM-ResourcesForInterference denotes CSI-IM setting for interference measurement. Also, nzp-CSI-RS-ResourcesForInterference denotes NZP CSI-RS setting for measuring an interference channel used for CSI reporting. reportConfigType is a field for configuring the transmission type of the corresponding CSI reporting, and reportQuantity is a field for configuring CSI reporting parameters used in the corresponding CSI reporting, for example, CRI, RI, PMI, CQI, and the like. In the the UE itself can select and report channel status information for some subbands in consideration of the limited amount of transmittable reporting. However, since the reporting on these selective subbands contains extremely limited information, the usefulness of the corresponding information is not significant. Therefore, the NR does not support such reporting, thereby reducing the complexity of the UE and increasing the efficiency of the reporting.

As described above, in the NR, two types of CSI reporting with low spatial resolution and high spatial resolution are supported as follows. The following Table 7 to 10 show two types of CSI reporting and reporting overhead required for each reporting type. Specifically, Table 7 below is a table describing type 1 CSI reporting.

TABLE 7

In case of two antenna ports, NR supports the following type 1 codebook.

$$W \in \left\{ \frac{1}{\sqrt{2}} \begin{bmatrix} 1 \\ e^{j\frac{\pi n}{2}} \end{bmatrix}, n = 0, 1, 2, 3 \right\} \text{for rank-1 and}$$

$$\left\{ \frac{1}{2} \begin{bmatrix} 1 & 1 \\ j^n & -j^n \end{bmatrix}, n = 0, 1 \right\} \text{for rank-2}$$

In case of four or more antenna ports, NR supports CSI reporting for ranks 1 to 8 as follows.

(1) PMI codebook assumes $W = W_1 W_2$ precoder structure, $$W_1 = \begin{bmatrix} B & 0 \\ 0 & B \end{bmatrix},$$

B is composed of L oversampled 2D DFT beams. For the ranks 1 and 2, the value of L can be set to 1 or 4, and W2 performs beam selection (applies only if L = 4) and indicates QPSK co-phasing for two polarizations.

TABLE 7-continued (2) The following 1D/2D antenna port layout ($N_1$, $N_2$) and oversampling index ($O_1$, $O_2$) are supported.

| Number of CSI-RS ports | ($N_1$, $N_2$) | ($O_1$, $O_2$) |
|---|---|---|
| 4  | (2, 1) | (4, —) |
| 8  | (2, 2) | (4, 4) |
|    | (4, 1) | (4, —) |
| 12 | (3, 2) | (4, 4) |
|    | (6, 1) | (4, —) |
| 16 | (4, 2) | |
|    | (8, 1) | (4, —) |
| 24 | (6, 2), (4, 3) | (4, 4) |
|    | (12, 1) | (4, —) |
| 32 | (8, 2), (4, 4) | (4, 4) |
|    | (16, 1) | (4, —) |

Figure 25:
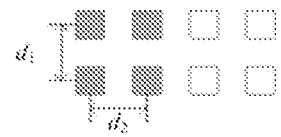
FIG. 25 illustrates a beam group pattern according to an embodiment of the disclosure.
Figure 25:
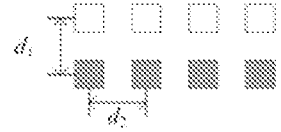

(3) In case of L = 4, the beam group (B) pattern illustrated in FIG. 25 is supported according to the value of $N_2$.

Table 8 below is a table describing type 2 CSI reporting.

TABLE 8

NR supports type 2 CSI reporting for ranks 1 and 2.
(1) PMI is used for spatial channel information feedback.
(2) PMI codebook assumes the following precoder structure for case of ranks 1 and 2.

For rank 1: $W = \begin{bmatrix} \tilde{W}_{0,0} \\ \tilde{W}_{1,0} \end{bmatrix} = W_1 W_2$, $W$ is normalized to 1

For rank 2: $W = \begin{bmatrix} \tilde{W}_{0,0} & \tilde{W}_{0,1} \\ \tilde{W}_{1,0} & \tilde{W}_{1,1} \end{bmatrix} = W_1 W_2$, columns of $W$ are normalized to $\frac{1}{\sqrt{2}}$ (3) $\tilde{W}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (combination of L beams with weight added)

The value of L can be set as one of 2, 3, and 4, $b_{k_1 k_2}$ denotes an oversampled 2D DFT beam, r denotes polarization as 0 or 1, and 1 denotes a layer as 0 or 1.
$p_{r,l,i}^{(WB)}$ denotes a wideband (WB) beam amplitude scaling factor for beam i, polarization r, and layer 1.
$p_{r,l,i}^{(SB)}$ denotes a subband (SB) beam amplitude scaling factor for beam i, polarization r, and layer 1.
$c_{r,l,i}$ denotes a beam coupling index (phase) for beam i, polarization r, and layer 1. In case of QPSK, $c_{r,l,i}$ is 2 bits, and in case of 8PSK, $c_{r,l,i}$ is 3 bits.
Amplitude scaling mode can be configured by a combination between WB and SB (non-uniform bit allocation) or only WB.

The following Table 9 describes reporting overhead for type 1 CSI reporting.

TABLE 9

| Number of CSI-RS ports | ($N_1$, $V_2$) | ($O_1$, $O_2$) | i1 Payload (L = 1) | i1 Payload (L = 4) | i2 payload |
|---|---|---|---|---|---|
| 4  | (2, 1) | (4, —) | 3 bits | 2 bits | For rank1, |
| 8  | (2, 2) | (4, 4) | 6 bits | 4 bits | 2 bits for L = 1, |
|    | (4, 1) | (4, 1) | 4 bits | 3 bits | 4 bits for L = 4 |
| 12 | (3, 2) | (4, 4) | 7 bits | 5 bits | For rank2, |
|    | (6, 1) | (4, —) | 4 bits | 3 bits | Additional 2 |
| 16 | (4, 2) | (4, 4) | 7 bits | 5 bits | bits |
|    | (8, 1) | (4, —) | 5 bits | 4 bits | for i1, |
| 24 | (6, 2), (4, 3) | (4, 4) | 8 bits | 6 bits | 1 bits for L = 1, |
|    | (12, 1) | (4, —) | 6 bits | 5 bits | 3 bits for L = 4 |
| 32 | (8, 2), (4, 4) | (4, 4) | 8 bits | 6 bits | |
|    | (16, 1) | (4, —) | 6 bits | 5 bits | |

The following Table 10 describes reporting overhead for type 2 CSI reporting. In particular, in case of amplitude combination between WB and SB, when (N1, N2)=(4,4), Z=3(8PSK), and K leading coefficients satisfy L=2, 3, 4, an example of cases of 4, 4, and 6 is described in Table 10.

TABLE 10

| L (*) | Rotation: $[\log_2(O_1 O_2)]$ | L-beam selection (**) | Strongest coefficient (1 out of 2 L): $[\log_2 2L]$ per layer | WB amp: $3 \times (2L - 1)$ per layer | Total WB payload | SB amp (1 SB): $1 \times (K - 1)$ per layer | SB phase (1 SB): $Z \times (K - 1)$ $2 \times (2L - K)$ per layer | Total payload (WB + 10 SBs) |
|---|---|---|---|---|---|---|---|---|
| Rank 1 payload (bits) | | | | | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |
| Rank 2 payload (bits) | | | | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

As described above, in the type 1 CSI reporting, the corresponding channel status can be reported to the base station through RI, PMI, CQI, CRI, etc., on the basis of the codebook as in the existing LTE. In contrast, the type 2 CSI reporting provides a higher type of resolution through more PMI reporting overhead to an indirect CSI similar to that of the type 1 CSI reporting, and such PMI reporting is generated through linear combination in which up to four orthogonal beams are multiplied by phase and amplitude and the resultant value is added. The UE can use the generated PMI reporting to report an eigenvector of a direct channel measured by the UE.

As described above, since the type 2 CSI requires high reporting overhead, such reporting may not be suitable for periodic CSI reporting where the number of reportable bits is not large. On the other hand, in the case of aperiodic CSI reporting, the corresponding CSI reporting is supported through the PUSCH which can support high reporting overhead, so that the type 2 reporting requiring this high reporting overhead can be supported only in aperiodic CSI reporting.

In addition, semi-persistent CSI reporting can support the type 2 CSI. In this case, since the amount of supportable CSI reporting is small in a short PUCCH, the type 2 CSI can be transmitted using a long PUCCH and can report only the wideband element of the corresponding CSI in consideration of the characteristics of PUCCH.

In the NR, periodic CSI reporting is performed using the offset and period configured through higher layer signaling. The semi-persistent CSI reporting is performed using the offset and period configured through higher layer signaling in case of PUCCH, and PUSCH-based semi-persistent CSI reporting is performed at a specific time point after. the UE receives an activation message using downlink control information (DCI).

Aperiodic CSI reporting may be triggered on the basis of the CSI reporting setting within the CSI measurement setting.

Figure 8:
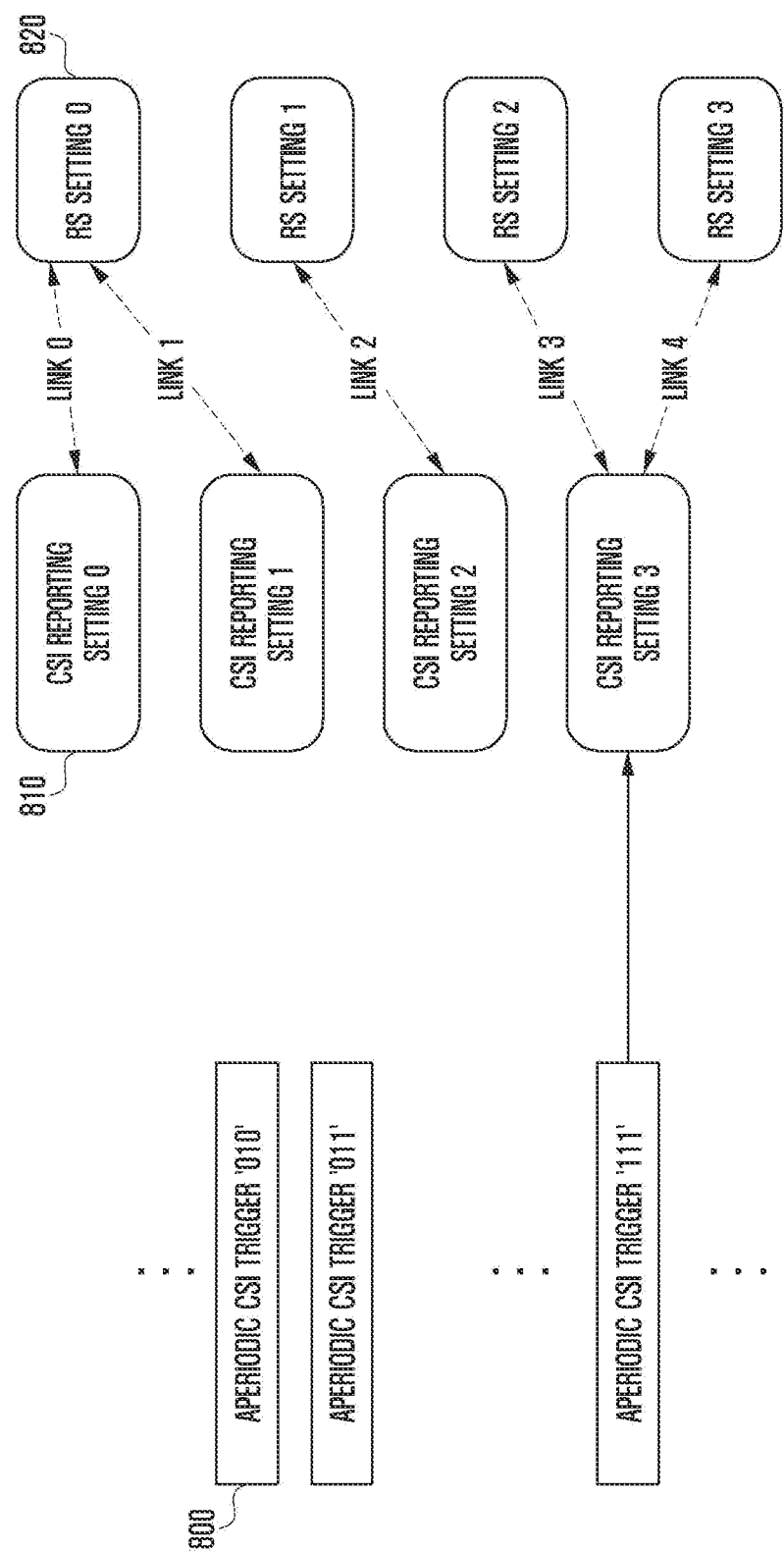
FIG. 8 is a diagram illustrating an example in which CSI reporting setting within CSI measurement setting is triggered based on CSI reporting setting according to an embodiment of the disclosure.

FIG. 8 is a diagram illustrating an example in which CSI reporting setting within CSI measurement setting is triggered according to a trigger in accordance with the above-described method according to an embodiment of the disclosure.

Referring to FIG. 8, a base station may configure CSI reporting setting 810, which is triggered for each trigger field 800 for the purpose of aperiodic CSI reporting, as RRC in advance. At this time, the base station may directly configure a CSI reporting setting ID in trigger configuration in order to configure the triggered CSI reporting setting. Table 11 below shows RRC information indicating CSI reporting setting for aperiodic CSI reporting trigger.

TABLE 11

```
-- ASN1START
-- TAG-CSI-APERIODICTRIGGERSTATELIST-START
CSI-AperiodicTriggerStateList ::=SEQUENCE      (SIZE      (1..maxNrOfCSI-
AperiodicTriggers)) OF CSI-AperiodicTriggerState
CSI-AperiodicTriggerState ::=                  SEQUENCE {
    associatedReportConfigInfoList             SEQUENCE
(SIZE(1..maxNrofReportConfigPerAperiodicTrigger))          OF         CSI-
AssociatedReportConfigInfo,
    ...
}
CSI-AssociatedReportConfigInfo ::=             SEQUENCE {
    reportConfigId                             CSI-
ReportConfigId,
    resourcesForChannel                                   CHOICE {
      nzp-CSI-RS
      SEQUENCE {
        resourceSet
        INTEGER (1..maxNrofNZP-CSI-RS-ResourceSetsPerConfig),
        qcl- info
```

TABLE 11-continued

```
SEQUENCE (SIZE(1..maxNrofAP-CSI-RS-ResourcesPerSet)) OF TCI-
StateId
   },
      csi-SSB-ResourceSet                    INTEGER
(1..maxNrofCSI-SSB-ResourceSetsPerConfig)
   },
   csi-IM-ResourcesforInteference         INTEGER(1..maxNrofCSI-IM-
ResourceSetsPerConfig)                    OPTIONAL,  -- Cond  CSI-IM-
forInterference
      nzp-CSI-RS-ResourcesforInterference   INTEGER    (1..maxNrofNZP-
CSI-RS-ResourceSetsPerConfig) OPTIONAL,   --    Cond   NZP-CSI-RS-
forInterference
   ...
}
-- TAG-CSI-APERIODICTRIGGERSTATELIST-STOP
-- ASN1STOP
```

Using such aperiodic CSI reporting trigger, it is possible to indirectly indicate an aperiodic CSI-RS 820 for channel measurement and interference measurement.

Figure 9:
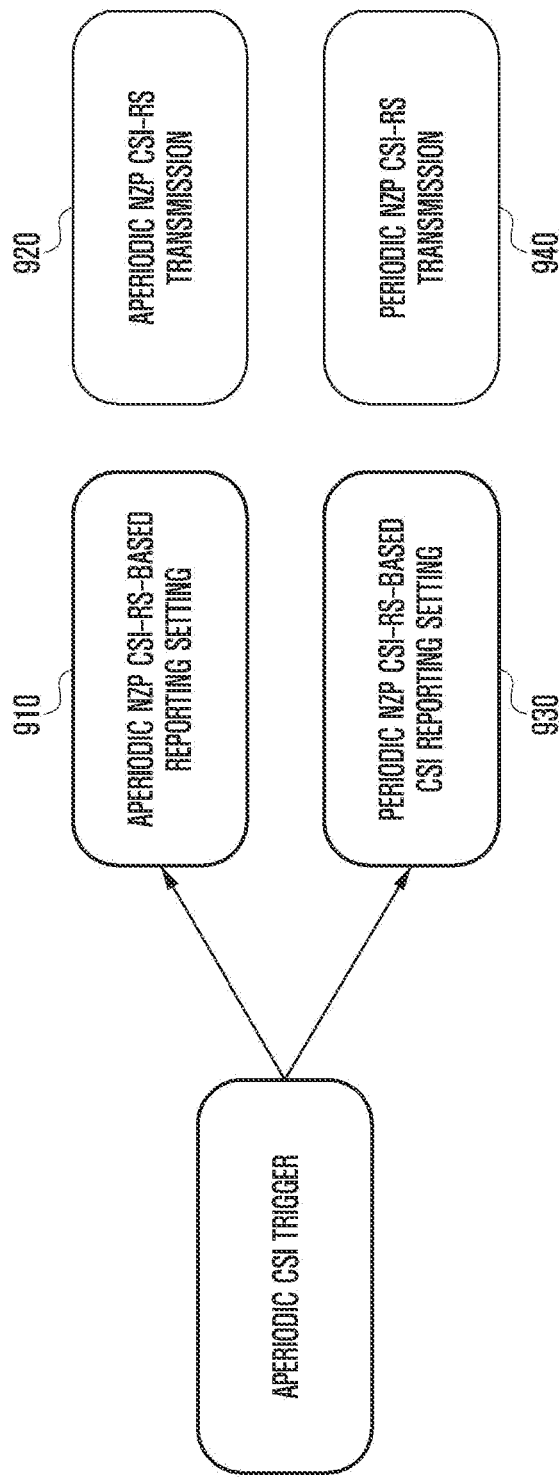
FIG. 9 is a diagram illustrating an example of indirectly indicating an aperiodic CSI-RS using an aperiodic CSI reporting indication field according to an embodiment of the disclosure.

FIG. 9 is a diagram illustrating an example of indirectly indicating an aperiodic CSI-RS using an aperiodic CSI reporting indication field according to an embodiment of the disclosure.

Referring to FIG. 9, a base station triggers a CSI-RS on the basis of CSI reporting settings 910 and 930. In this case, if a resource supported for channel and interference measurement in resource setting connected to the corresponding link is a periodic CSI-RS in 920, the corresponding aperiodic CSI may be estimated on the basis of the channel measured in the existing periodic CSI-RS resource, and if a resource supported for channel measurement in resource setting connected to the corresponding link is an aperiodic CSI-RS in 940, the corresponding aperiodic CSI reporting may be estimated on the basis of the channel measured in the CSI-RS resource which is aperiodically configured. At this time, slot offset between a DCI including a trigger and CSI reporting can be transmitted between aperiodic CSI reporting trigger and aperiodic CSI-RS, through higher layer signaling.

Here, for supporting such CSI reporting, the base station may configure resources for desired signal and interference measurement to the UE through the resource setting shown in FIG. 7. For the resource setting, the following RRC parameters may be configured. Table 12 shows CSI-RS Resource Config for the resource setting.

TABLE 12

| Parameter name | Description | Value range |
| --- | --- | --- |
| CSI-RS-ResourceConfig | CSI-RS resource configuration | |
| CSI-RS-ResourceConfigId | CSI-RS resource configuration ID | 0 . . . CSI-RS-ResourceMax − 1 |
| ResourceConfigType | Time domain behavior of resource configuration | Aperiodic, semi-persistent, or periodic |
| CSI-ResourcePeriodicityAndOffset | Contains periodicity and slot offset for periodic/semi-persistent CSI-RS | |
| NrofPorts | Number of ports | 1, 2, 4, 8, 12, 16, [24], 32 |
| CSI-RS-ResourceMapping | Include parameters to capture OFDM symbol and subcarrier occupancy of the CSI-RS resource within a slot | |
| CDMType | Includes parameters to capture CDM value (1,2, 4, or 8), CDM pattern (freq only, time and freq, time only) | |
| CSI-RS-Density | Density of CSI-RS resource measured in RE/port/PRB | e.g., ½, 1, >1 |
| CSI-RS-FreqBand | Includes parameters to enable configuration of wideband and partial band CSI-RS | |
| Pc | Power offset of NZP CSI-RS RE to PDSCH RE | |
| Pc-SS | Power offset of NZP CSI-RS RE to SS/PBCH block | |
| ScramblingID | Scrambling ID | |
| CSI-RS-ResourceRep | Configuration of CSI-RS resource repetition | |

Based on the resource setting, the NR may support beam measurement, reporting, and management. NR MIMO supports a large number of antennas and transmission and reception in a high frequency band such as 28 GHz. Wireless communication using such a millimeter-wave experiences high linearity and high path loss due to the characteristics of the corresponding band, and in order to overcome this, hybrid beamforming combined with analog beamforming based on radio frequency (RF) and antenna phase shifting and digital beamforming based on digital precoding are required.

Figure 10:
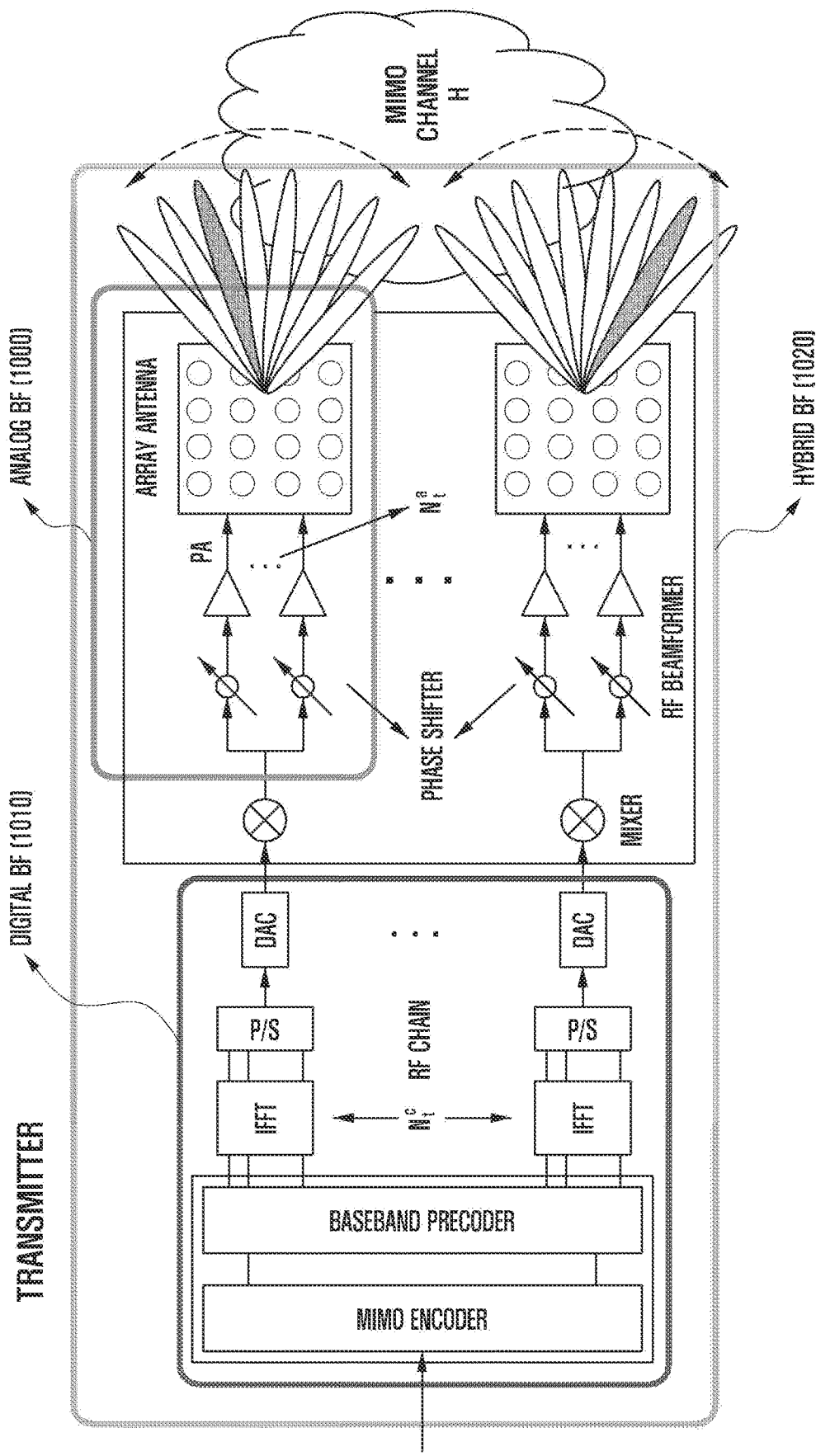
FIG. 10 is a diagram illustrating an example of a hybrid beam forming system according to an embodiment of the disclosure.

FIG. 10 is a diagram illustrating an example of such a hybrid beam forming system according to an embodiment of the disclosure.

Referring to FIG. 10, a base station and a UE include an RF chain and a phase shifter for digital beamforming and analog beamforming, respectively. Analog beamforming 1000 on the transmission side is a method of concentrating the corresponding signal toward a specific direction by changing the phases of signals transmitted from a plurality of antennas through the phase shifter when signals are transmitted using the antennas. To this end, an array antenna, which is a collection of a plurality of antenna elements, is used. The use of such transmission beamforming can increase the propagation distance of the corresponding signal. Since signals are minimally transmitted in directions other than the corresponding direction, interference to other users is greatly reduced. Similarly, the reception side can also perform reception beamforming using reception array antenna, which also concentrates the reception of the radio waves toward a specific direction to increase the sensitivity of signals coming in the corresponding direction and to exclude signals coming in directions other than the corresponding direction from the reception signal, thereby cutting off interference signals.

Meanwhile, a required separation distance between antennas is proportional to the wavelength of a transmission frequency (e.g., may be a half wavelength interval). Therefore, as the transmission frequency increases, the wavelength of the radio waves becomes shorter, so that the array antenna can be configured with more element antennas in the same area. Considering this aspect, a communication system operating in a high frequency band is advantageous for a beam forming technique applied thereto because a higher antenna gain can be obtained than in a case of using a beam forming technique in a low frequency band.

In this beamforming technique, in order to obtain a higher antenna gain, hybrid beamforming 1020 combining digital precoding 1010 used for obtaining a high data rate effect in the multi-antenna system of the related art is used in addition to application of the analog beamforming technique. In this case, when the beam is formed through the analog beamforming and one or more analog beams are formed, digital precoding similar to that applied in the multiple antennas of the related art is applied to the baseband and transmitted, thereby achieving more reliable signal reception and higher system capacity.

Figure 11:
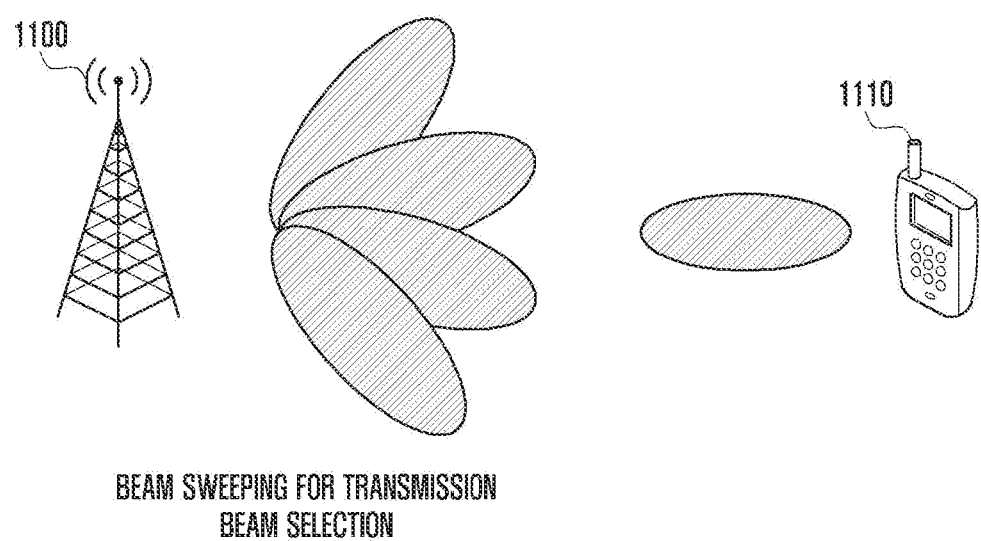
FIG. 11 illustrates an example of a beam sweeping operation of a base station according to an embodiment of the disclosure.
Figure 12:
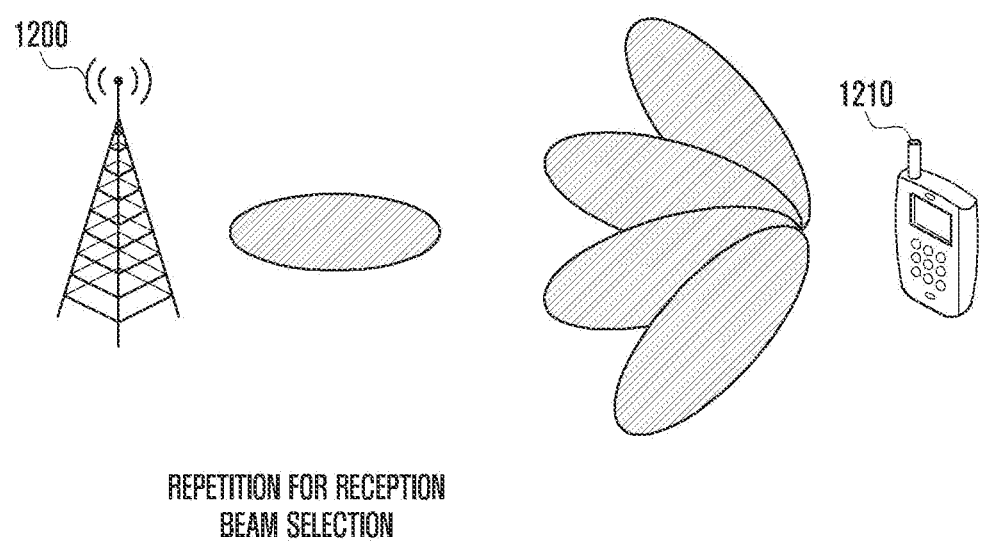
FIG. 12 illustrates an example of a beam sweeping operation of a UE according to an embodiment of the disclosure.
Figure 13:
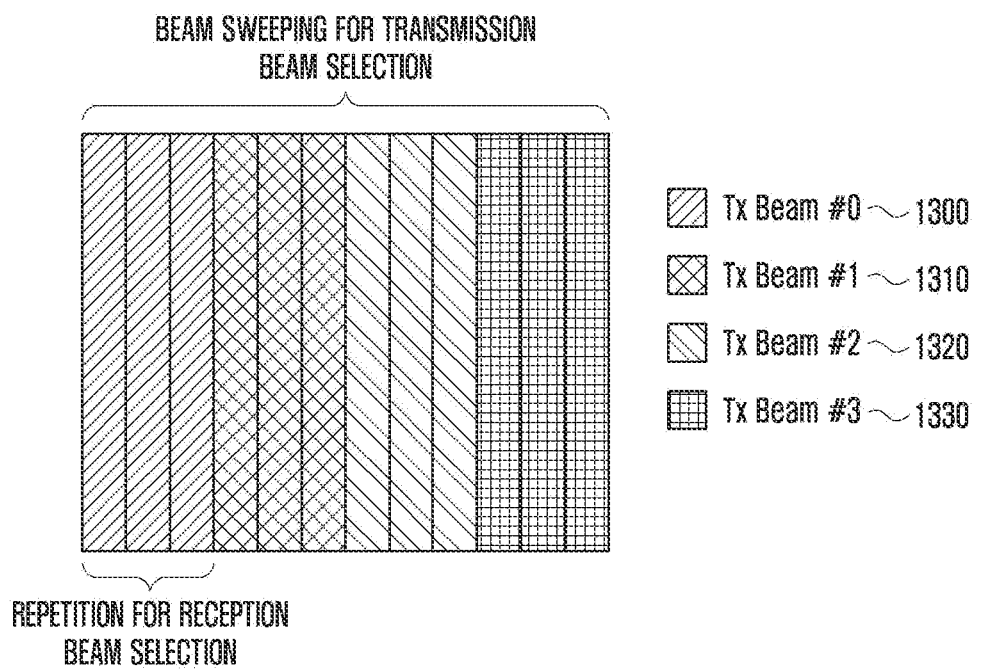
FIG. 13 illustrates an example of reference signal transmission for a transmission beam selection operation of a base station and a reception beam selection operation of a UE according to an embodiment of the disclosure.

In applying the beamforming, it is most important to select an optimized beam direction for the base station and the UE. In order to select the optimized beam direction, the base station and the UE may support beam sweeping using a plurality of time and frequency resources. FIGS. 11, 12, and 13 are diagrams illustrating the beam sweeping operation of a UE and a base station.

FIG. 11 illustrates an example of a beam sweeping operation of a base station according to an embodiment of the disclosure.

Referring to FIG. 11, a base station 1100 transmits a plurality of transmission beams to a UE 1110 for the purpose of transmission beam selection of the base station. Based on this, the UE may determine an optimal beam suitable for transmitting data to the UE and may inform the base station of the determined optimal beam.

FIG. 12 illustrates an example of a beam sweeping operation of a UE according to an embodiment of the disclosure.

Referring to FIG. 12, a base station 1200 may repeatedly transmit the same beam for the purpose of reception beam selection of a UE, and a UE 1210 may determine the reception beam of the UE for each beam on the basis of the repeated transmission and may inform the base station of the determined reception beam or may use the reception beam of the UE determined according to a base station transmission beam indicated by the base station.

FIG. 13 illustrates an example of reference signal transmission for a transmission beam selection operation of the base station and a reception beam selection operation of the UE which are shown in FIGS. 11 and 12 according to an embodiment of the disclosure.

Referring to FIG. 13, a UE or a base station transmits a reference signal using a different beam to a time resource for beam selection of the UE or the base station. At this time, the base station or the UE receiving the reference signal may measure the quality of the reference signal on the basis of the CQI and reference signals received power (RSRP) of the reference signal, and may select one or a plurality of transmission or reception beams according to the corresponding results. Although FIG. 13 shows transmission of the reference signal on the basis of different beams through different time resources, it can be equally applied to frequency, cyclic shift, and code resources. At this time, as shown in FIG. 13, the base station or the UE may transmit a plurality of transmission beams (transmission beam #0 to #3) 1300, 1310, 1320, and 1330 for the purpose of transmission beam sweeping, and may repeatedly apply and transmit one transmission beam for reception beam sweeping.

The beam management operation such as beam sweeping may also be performed on the basis of the CSI reporting framework (resource setting, CSI reporting setting, CSI measurement setting, link, etc.) described in FIG. 7 to FIG. 9, and the periodic, semi-persistent, and aperiodic CSI-RS transmission, CSI reporting, and beam reporting.

In supporting the CSI reporting or the beam reporting, the NR configures a plurality of CSI-RS resources in a CSI-RS resource set for the purpose of the transmission of a plurality of beams for transmission beam sweeping and the repeated transmission of one transmission beam for reception beam sweeping at the time of resource setting, and configure whether the CSI-RS resources are individual CSI-RS resources or whether the same CSI-RS resource is repeated. To this end, RRC configuration parameters of Table 13 below may be provided. Table 13 shows parameters within CSI-RS Resource Set Config for CSI-RS resource set configuration.

TABLE 13

| Parameter name | Description | Value range |
| --- | --- | --- |
| Nzp-CSI-ResourceSetId | NZP CSI-RS Resource Set ID | |
| Nzp-CSI-RS-Resources | Configuration of NZP CSI-RS Resources in the Resource Set | SEQUENCE (SIZE (1 . . . maxNrofNZP-CSI-RS-ResourcesPerSet)) OF NZP-CSI-RS-ResourceId |
| repetition | Configuration of repetition | {on, off} |
| aperiodicTriggeringOffset | Aperiodic NZP CSI-RS offset | 0, . . . , 4 |
| trs-Info | Usage for TRS | |

A plurality of NZP CSI-RS resources can be configured through Nzp-CSI-RS resources for a resource set as shown in Table 13, and whether the plurality of NZP CSI-RS resources are used as tracking RS (TRS) for each CSI-RS resource set (trs-info) can be configured. In case of aperiodic CSI-RS, slot offset for the corresponding transmission may be configured through aperiodicTriggeringOffset. In addition, repetition of the CSI-RS resource can be configured. Thus, when the UE generates channel status information or beam information by measuring the CSI-RS resources configured in the corresponding CSI-RS resource set, whether it is assumed that individual CSI-RS resources are transmitted on the basis of different beams for the purpose of base station transmission beam sweeping (that is, assumed that individual NZP CSI-RS resources use different spatial domain transmission filters) or whether it is assumed that individual CSI-RS resources are transmitted on the basis of the same beams for the purpose of UE reception beam sweeping (that is, assumed that all NZP CSI-RS resources use the same spatial domain transmission filter) can be configured.

In this case, in configuring the repetition of the CSI-RS resource in the corresponding CSI-RS resource set configuration, only 1-port CSI-RS or 1-port or 2-port CSI-RS resources can be configured. In performing the transmission beam sweeping and the reception beam sweeping described in FIG. 13, the number of transmission beams is 128 or the like which is large, and the number thereof may become larger when considering reception beam sweeping. Thus, by limiting the number of the antenna ports to a maximum 1 port or 2 ports for the purpose of the configuration of the CSI-RS resources required for the corresponding sweeping, it is possible to reduce the overhead required for the reference signal transmission and efficiently support the beam management.

In addition, when the periods of NrofPorts and CSI-ResourcePeriodicityAndOffset are configured at the time of the repetition of the CSI-RS resource, other configurations may not be allowed or may be ignored. This is because it is difficult for the UE to use the CSI-RS within the same OFDM symbol to measure another reception beam quality at the time of sweeping a plurality of reception beams of the UE.

In addition, as to other configurations except for CSI-RS-ResourceMapping configuration at the time of CSI-RS resource repetition, that is, ResourceConfigType, CSI-RS-timeConfig, NrofPorts, CDMType, CSI-RS-Density, CSI-RS-FreqBand, Pc, ScramblingID, and the like, if a different configuration is not allowed for each CSI-RS resource or the CSI-RS resources are configured differently, the UE may ignore the corresponding configuration. This is because, in a case in which the UE sweeps a plurality of reception beams of the UE, if the density of the CSI-RS is different, it may be difficult to relatively compare RSRP and CQI for the corresponding beam measurement. In addition, in a case in which a specific CSI-RS resource is frequently transmitted and another resource is not relatively frequently transmitted due to different periods, the reception beam sweeping required by the UE is difficult to be completely performed. Further, when Pc which is a boosting value of the corresponding CSI-RS power or CSI-RS-FreqBand which is a transmission frequency band are configured differently for the purpose of the same beam transmission, even if the RSRP for each reception beam is changed and the UE corrects the RSRP, the accuracy may be lowered. Therefore, in order to reduce the hardware complexity of the UE in the CSI-RS repetition configuration at the time of CSI-RS resource repetition for the corresponding reception beam sweeping and to efficiently operate the reception beam sweeping of the UE, the configuration of the CSI-RS resources included in the corresponding CSI-RS resource set may be limited.

In NR Phase-I (3GPP Release 15), up to two or four CRIs (CSI-RS resource indicator or CSI-RS resource set indicator) and L1-RSRP reporting are supported on the basis of the CSI-RS resources and resource set in the resource setting configured in the UE. In the LTE, the RSRP may measure the strength of the related reference signal transmitted to the UE as a linear average of a downlink reference signal transmitted in the channel bandwidth, and may report, to the base station, the index of the CSI-RS resource in which a high RSRP is measured or the resource set and the measured power intensity value of the corresponding resource or resource set.

A Heterogeneous network (HetNet) is a network system that off-loads the saturated traffic of a macro cell to reduce the burden of the macro cell by adding low power nodes such as a small cell, a picocell, a nano cell, and the like, to thereby improve the entire performance of the wireless communication system. Table 14 below illustrates the types of heterogeneous cells that can be supported by HetNet and shows the transmission power and coverage of the corresponding cell.

TABLE 14

| Type of nodes | Transmit power | Coverage | Height |
| --- | --- | --- | --- |
| Macro-cell | 46 dBm | Few km | 25 m (UMa), 10 m (UMi) |
| Pico-cell | 23-30 dBm | <300 m | 3 m |
| Femto-cell | <23 dBm | <50 m | 3 m |
| Relay | 30 dBm | 300 m | — |

As shown in the above Table 14, the macro cell uses higher transmission power of at least 15 dB than that of a picocell or a femtocell. Also, since the signal is transmitted at a higher location, it is easy to secure a line-of-sight (LOS), which is more advantageous in terms of channel environment than a picocell or a femtocell. Considering this, even if a distance between the UE and the macro cell is longer, it may be more advantageous for the UE to access the macro cell, so that the coverage of the macro cell in the downlink is larger than that of the picocell or femtocell. However, since a signal is transmitted by the UE in the uplink, the signal is transmitted with the same transmission power regardless of the macro cell, the picocell, and the femtocell. Since the average height of the UE is about 1.5 m, the effect by the channel is also lowered. Therefore, the macro cell, the picocell, and the femtocell have similar coverage in the uplink, unlike the downlink, where the macro cell has much wider coverage.

Figure 14A:
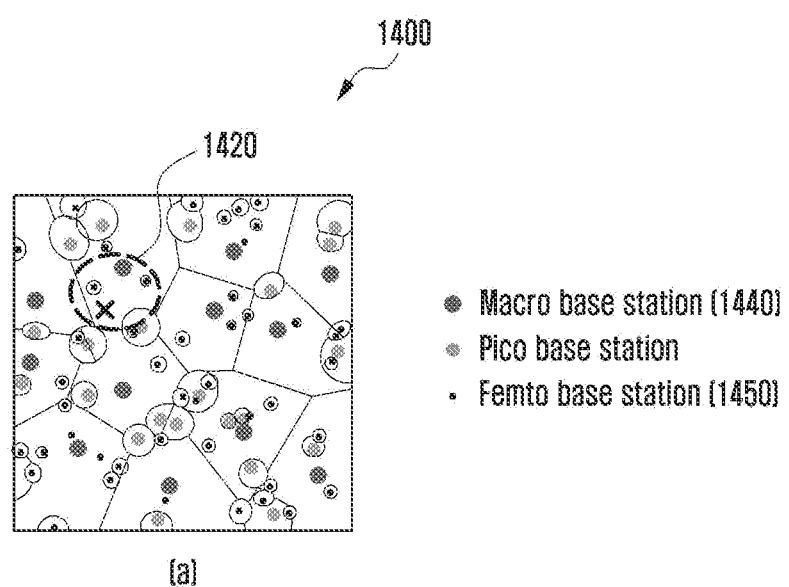
FIG. 14A is a diagram illustrating an example of optimal coverage in downlink and uplink in a Heterogeneous network (HetNet)
Figure 14B:
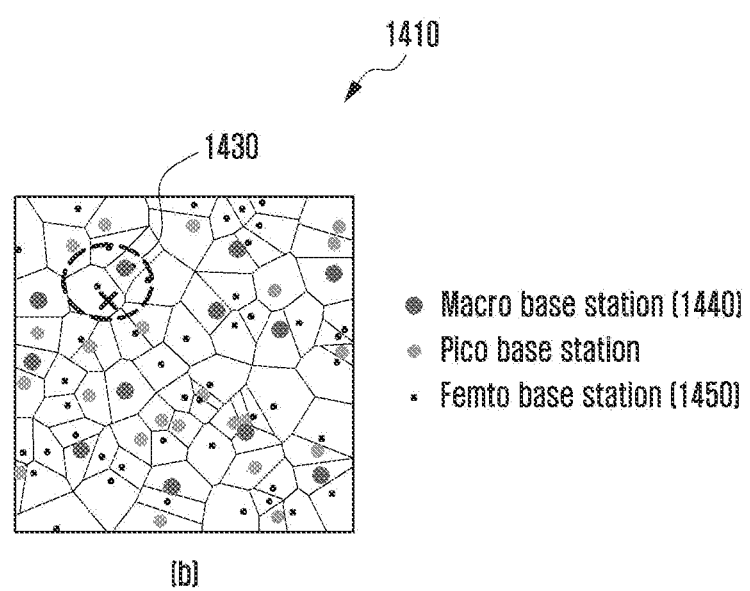
FIG. 14B is a diagram illustrating an example of optimal coverage in downlink and uplink in a HetNet according to an embodiment of the disclosure.

FIG. 14A is a diagram illustrating an example of optimal coverage in downlink and uplink in a HetNet according to an embodiment of the disclosure, and FIG. 14B is diagram illustrating an example of optimal coverage in downlink and uplink in a HetNet according to an embodiment of the disclosure.

Referring to FIGS. 14A and 14B, it can be seen that the coverage in case of a downlink 1400 of FIG. 14A and the coverage in case of an uplink 1410 of FIG. 14B are significantly different. In FIGS. 14A and 14B, Xs of reference numerals 1420 and 1430 refer to UEs at the same position. However, in case of the downlink 1400, it is optimal that the UE is connected to a macro cell 1440. However, in case of the uplink 1410, it can be seen that it is optimal that the UE is connected to a neighboring femtocell 1450. Accordingly, in order to provide different coverage to the downlink and the uplink, the UE is connected to another cell and operated so that more data can be offloaded from the macro cell to the femtocell or picocell. As a result, the overall system performance may be improved and the femtocell or the picocell that requires lower installation and maintenance costs may be utilized to reduce the costs, and data may be transmitted to a neighboring cell at the time of uplink transmission, thereby reducing the transmission power of the UE and reducing battery power consumption of the UE.

Figure 15:
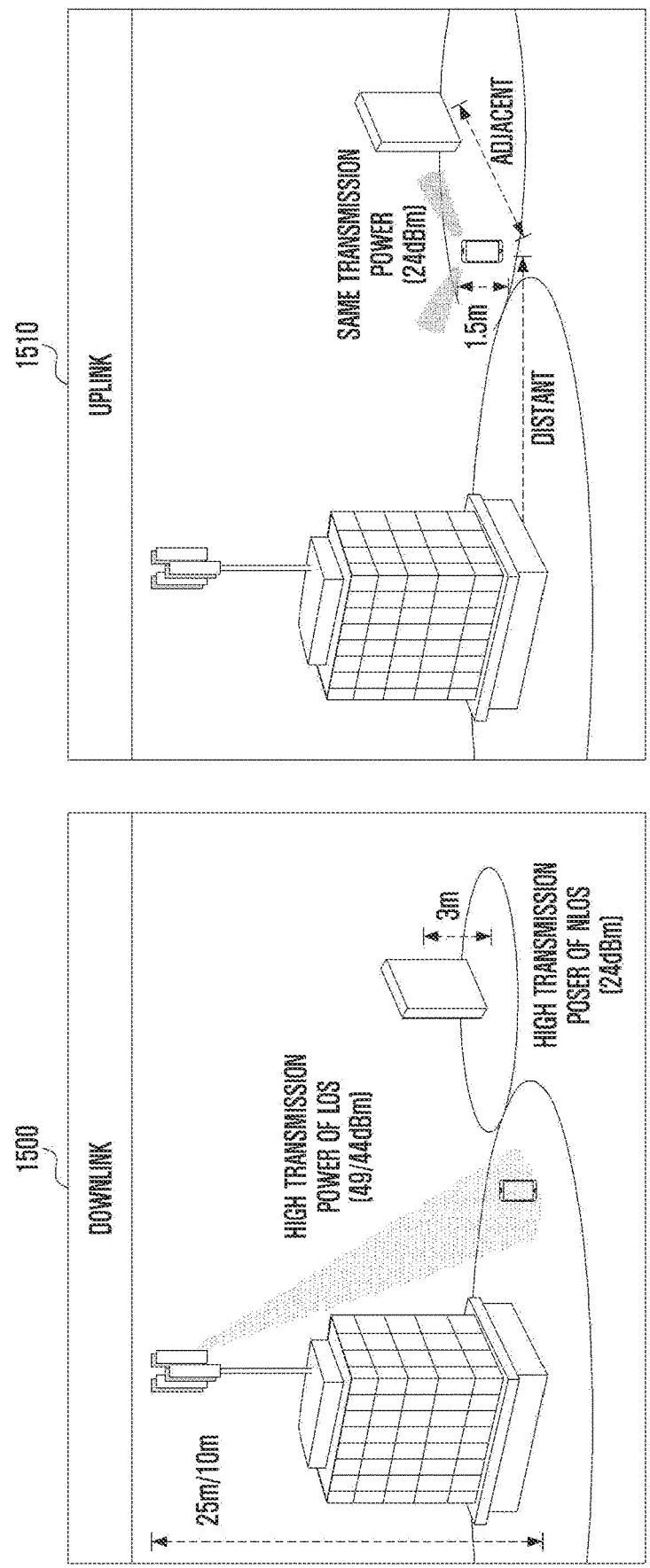
FIG. 15 is a diagram illustrating an example in which a UE is connected to another cell and operates in downlink and uplink transmission according to an embodiment of the disclosure.

FIG. 15 is a diagram illustrating an example in which a UE is connected to another cell and operates in downlink and uplink transmission according to an embodiment of the disclosure.

Referring to FIG. 15, in case of downlink 1500, a UE belongs to the coverage of a macro cell and receives a signal, but in case of uplink 1510, the UE is connected to an adjacent femtocell or picocell and transmits a signal.

At this time, when the UE is connected to another cell and operates at the time of downlink and uplink transmission proposed in the disclosure, a cell supporting downlink may be referred to as a macro cell (MCell), a downlink cell (DCell), a primary cell (PCell), or the like, and a cell supporting uplink may be referred to as a small cell or a secondary cell (SCell), an uplink cell (UCell), or the like.

In order to support this operation, it may be considered that the UE is connected to another cell in the uplink and the downlink from the initial connection operation of the UE. As described with reference to FIG. 6, in the related art, the connection of the UE is performed through a single cell and a four-operation connection procedure at the time of initial connection, but in a new connection method proposed in the disclosure, the UE is required to be initially connected to another cell in the uplink and the downlink, respectively. Hereinafter, the expression of transmitting/receiving a signal to/from a cell can be understood as transmitting/receiving a signal to/from a base station controlling the cell, and the cell and the base station may be mixed.

Figure 16:
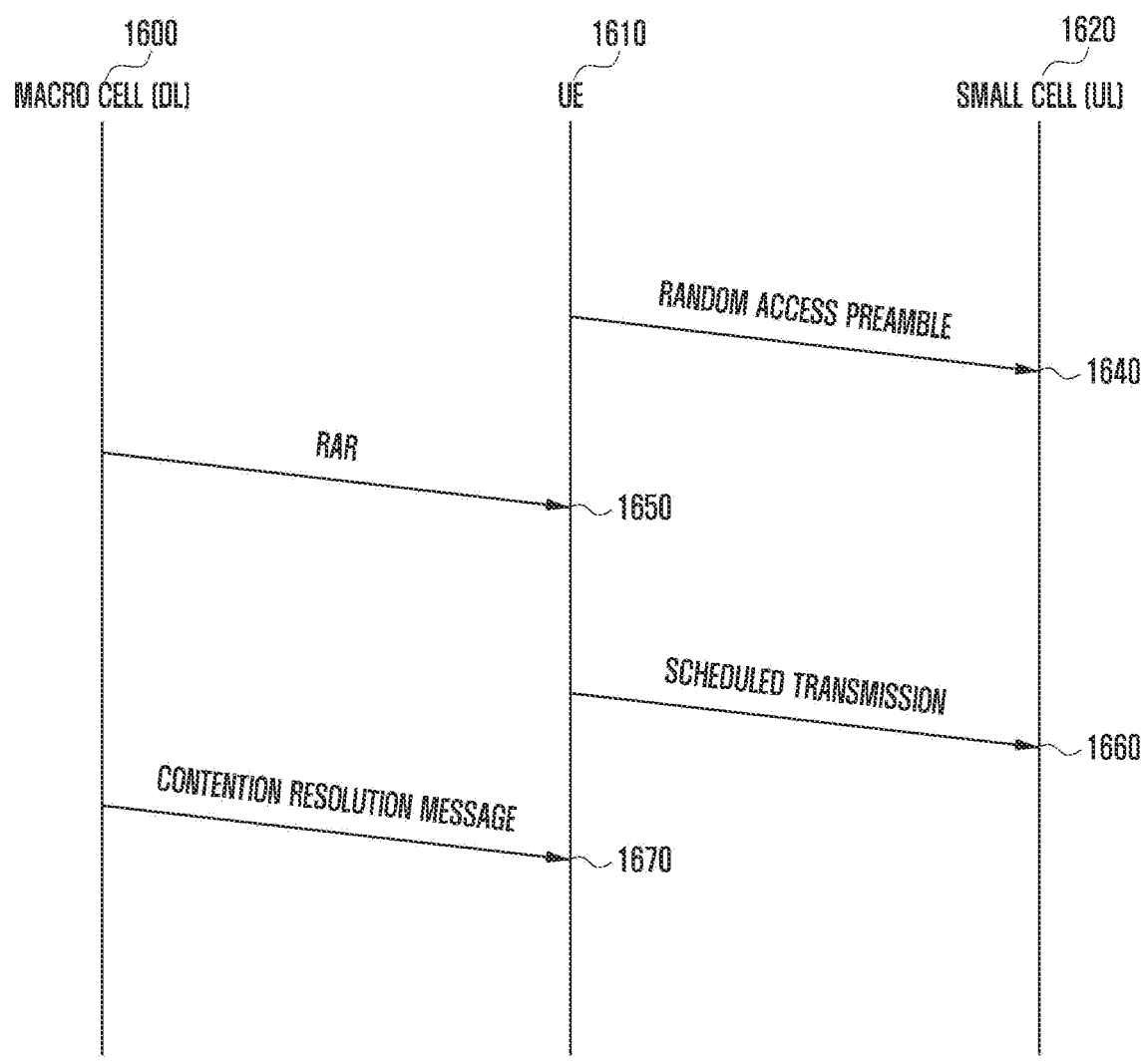
FIG. 16 is a diagram illustrating an example in which each of uplink and downlink is initially connected to a different cell according to an embodiment of the disclosure.

FIG. 16 is a diagram illustrating an example in which each of uplink and downlink is initially connected to a different cell according to an embodiment of the disclosure.

For example, a UE 1610 transmits a random access preamble to a small cell 1620 in 1640. Although not shown, the UE 1610 may previously receive an MIB and a system information block (SIB) from a macro cell 1600 to confirm information for initial connection. Next, the UE receives a random access response (RAR) from the macro cell 1600 in 1650. The UE that has confirmed information such as UL grant included in the RAR transmits Msg 3 to the small cell 1620 on the basis of the information in 1660. Next, the UE 1610 receives a contention resolution message from the macro cell 1600 in 1670.

Referring to FIG. 16, the UE is required to perform SSB detection within an SS block and PBCH decoding and to transmit the random-access preamble to another cell. The UE currently measures the SSB to measure the RSRP of the corresponding SSB and PBC, thereby determining an optimal cell for downlink connection. However, in order to determine an uplink connection cell (which can be mixed with the uplink cell), power that reaches the base station when the UE actually transmits data using the same power is more important than the measurement value based on the transmission power of the base station. Therefore, operations in which the UE calculates a path loss on the basis of the RSRP transmission power of the SSB and PBCH transmitted in the downlink by uplink connectable cells and is connected to a cell having a low path loss should be supported.

Figure 17:
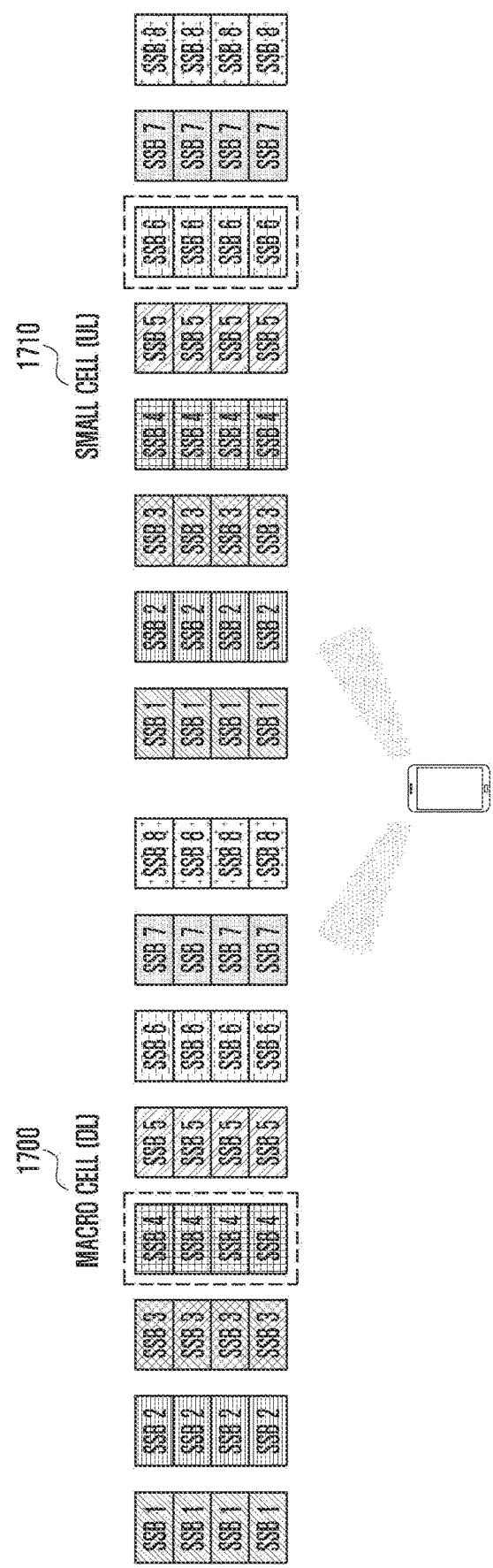
FIG. 17 is a diagram illustrating an example in which a UE selects another cell according to another cell selection scheme in downlink and uplink according to an embodiment of the disclosure.

FIG. 17 is a diagram illustrating an example in which a UE selects another cell according to another cell selection scheme in downlink and uplink according to an embodiment of the disclosure.

The UE selects a cell on the basis of RSRP when selecting a cell to be downlink-connected in 1700, and the selected cell may be a macro cell. At this time, the UE receives an SIB from the macro cell, and a plurality of pieces of random-access channel (RACH) configuration information on a small cell for uplink connection may be included in the SIB. The UE selects a cell on the basis of a path loss when selecting a cell to be uplink-connected in 1710, and the selected cell may be a small cell. Next, the UE performs uplink transmission to the small cell, and RACH transmission (that is, random access preamble transmission) may be included in the uplink transmission.

In addition, although description has been made based on a method of selecting a cell on the basis of a path loss in the disclosure, metrics based on various qualities such as a signal to noise ratio (SNR), a signal to interference and noise ratio (SINR), a reference signal received quality (RSRQ), and the like, which are similar to the above description, may also be used. When the quality-based metrics are used, the UE calculates the SNR, SINR, and RSRQ of a signal to be used in the uplink transmission by using power to be used for the uplink transmission as the power of the actually received signal on the basis of the transmission power value transmitted from the base station.

Referring to FIG. 17, the UE may receive configuration of the transmission power value of the SSB and PBCH, and may select a cell for uplink operation on the basis of the path loss of the corresponding transmission based on the received configuration.

First, in order to inform the UE whether such an operation is supported, the base station can transmit the following information to the UE in the MIB or SIB.

Whether initial connection using different cells in downlink and uplink is supported: Whether initial connection procedure is supported in other downlink and uplink cells at the time of initial connection proposed in the disclosure.

List of uplink cell operable in corresponding downlink cell: In order to support initial access procedure in other downlink and uplink cells at the time of initial connection proposed in the disclosure, corresponding downlink cell and uplink cell should be connected to each other using backhaul. Thus, cells that can support this operation may be limited. At this time, the base station may transmit a list of such supportable cells so that the UE may conform a pair of cells that can support together corresponding function.

Transmission power class of corresponding base station: Base station can indicate whether base station of corresponding uplink cell supports high transmission power (e.g., 46 dBm) or low transmission power (e.g., 24 dBm), or directly inform downlink transmission power of corresponding base station or indicate approximate range of downlink maximum transmission power for SS block of corresponding base station as shown in Table 15.

TABLE 15

| Bit | ss-PBCH-BlockPower |
|---|---|
| 0 | −60 dBm |
| 1 | −50 dBm |
| 2 | −40 dBm |
| 3 | −30 dBm |
| 4 | −20 dBm |
| 5 | −10 dBm |
| 6 | 0 dBm |
| 7 | 10 dBm |
| 8 | 20 dBm |
| 9 | 30 dBm |
| 10 | 40 dBm |
| 11 | 50 dBm |

As to this information, all of the related information may be transmitted to the UE in the MIB or SIB as described above, or may be indicated in combination of the MIB and the SIB. For example, whether the initial connection is supported does not require many bits to indicate and the UE can receive the SIB for the information when this information is checked, so that whether the initial connection is supported may be transmitted to the MIB and information about the remaining candidate cells and the related power value may be transmitted through the SIB. In addition, in order to reduce additional instruction overhead, a cell list supporting measurement may be tagged to indicate a cell capable of uplink connection in the corresponding cell. Table 16 below shows an example in which a tag is added to such a serving cell list.

TABLE 16

```
MeasResultServMOList ::=                              SEQUENCE
(SIZE (1..maxNrofServingCells)) OF MeasResultServMO
MeasResultServMO ::=                                  SEQUENCE
                                                      {
    servCellId
    ServCellIndex,
    measResultServingCell
    MeasResultNR,
    measResultBestNeighCell
    MeasResultNR
                                                      OPTIONAL,
    culpossible                         ENUMERATED {true}
        OPTIONAL,
    ...
}
```

As shown in the above Table 16, the base station may indicate whether a corresponding neighboring cell supports a cooperative UL (CUL) operation. If the corresponding cell supports the CUL operation, an additional configuration field for the CUL operation may be transmitted to the UE by the base station that provides MIB, SIB, and RRC information through the downlink.

In addition, information such as frequency information of an uplink connectable cell, uplink configuration, SSB position, SSB period, and the like can be transmitted to the UE. In this case, the following additional cell configuration information may be additionally transmitted in addition to ServingCellConfigCommon.

TABLE 17

```
AdditionalCellConfig ::=    SEQUENCE {
    physCellId                              PhysCellId
    OPTIONAL, -- Cond HOAndServCellAdd,
    frequencyInfoDL                         FrequencyInfoDL
    OPTIONAL, -- Cond InterFreqHOAndServCellAdd
    initialDownlinkBWP                      BWP-
DownlinkCommon
        OPTIONAL, -- Cond ServCellAdd
    uplinkConfigCommon
    UplinkConfigCommon
        OPTIONAL, -- Cond ServCellAdd-UL
    supplementaryUplinkConfig
    UplinkConfigCommon
        OPTIONAL, -- Cond ServCellAdd-SUL
    n-TimingAdvanceOffset                   ENUMERATED
{ n25560, n39936 }
    OPTIONAL,-- Need S
    ssb-PositionsInBurst                    CHOICE {
        shortBitmap                                     BIT
STRING (SIZE (4)),
        mediumBitmap                                    BIT
```

TABLE 17-continued

```
STRING (SIZE (8)),
    longBitmap                          BIT
STRING (SIZE (64))
    }
        OPTIONAL, -- Need R,
    ssb-periodicityServingCell          ENUMERATED { ms5, ms10,
ms20, ms40, ms80, ms160, spare2, spare1 }    OPTIONAL, -- Need S
    dmrs-TypeA-Position                 ENUMERATED
{pos2, pos3},
    lte-CRS-ToMatchAround               SetupRelease
{ RateMatchPatternLTE-CRS }
    OPTIONAL, -- Need M
    rateMatchPatternToAddModList        SEQUENCE       (SIZE
(1..maxNrofRateMatchPatterns)) OF RateMatchPattern
    OPTIONAL, -- Need N
    rateMatchPatternToReleaseList       SEQUENCE       (SIZE
(1..maxNrofRateMatchPatterns)) OF RateMatchPatternId
    OPTIONAL, -- Need N
    subcarrierSpacing                   SubcarrierSpacing
        OPTIONAL, -- Need S
    tdd-UL-DL-ConfigurationCommon1      TDD-UL-DL-
ConfigCommon
            OPTIONAL, -- Cond TDD1
    tdd-UL-DL-ConfigurationCommon2      TDD-UL-DL-
ConfigCommon
            OPTIONAL, -- Cond TDD2
    ss-PBCH-BlockPower                  INTEGER        (-
60..50),
    ...
}
```

Although the above information is shown assuming that all basic information used for the corresponding downlink cell is also provided to the additional information for the uplink cell, some pieces of information may be omitted for simplicity of operation and implementation of the base station and the UE. For example, it can be assumed that information of the downlink cell and the uplink cell may be the same in the transmission period and position of the SSB or the position of a type A DMRS, LTE CRS rate matching, and the like. In this case, the corresponding information may not exist in the configuration information of the uplink cell.

In addition, as shown in FIG. 17, the UE may additionally receive RACH configuration for transmitting the random access preamble to another uplink cell as shown in Table 18 below.

TABLE 18

```
RACH-ConfigAdditional ::=                       SEQUENCE {
    rach-ConfigGeneric              RACH-ConfigGeneric,
    totalNumberOfRA-Preambles                   INTEGER (1..63)
                                    OPTIONAL,  -- Need S
    ssb-perRACH-OccasionAndCB-PreamblesPerSSB   CHOICE {
        oneEighth
    ENUMERATED
{n4,n8,n12,n16,n20,n24,n28,n32,n36,n40,n44,n48,n52,n56,n60,n64},
        oneFourth
    ENUMERATED
{n4,n8,n12,n16,n20,n24,n28,n32,n36,n40,n44,n48,n52,n56,n60,n64},
        oneHalf
    ENUMERATED
{n4,n8,n12,n16,n20,n24,n28,n32,n36,n40,n44,n48,n52,n56,n60,n64},
        one
    ENUMERATED
{n4,n8,n12,n16,n20,n24,n28,n32,n36,n40,n44,n48,n52,n56,n60,n64},
        two
        ENUMERATED {n4,n8,n12,n16,n20,n24,n28,n32{,
        four
        INTEGER (1..16),
        eight
        INTEGER (1..8),
        sixteen
        INTEGER (1..4)
    }
                                                OPTIONAL, --
Need M
    groupBconfigured                            SEQUENCE {
        ra-Msg3SizeGroupA
        ENUMERATED { b56, b144, b208, b256, b282, b480, b640,
            b800, b1000, spare7, spare6, spare5, spare4, spare3, spare2,
spare1},
```

TABLE 18-continued

```
        messagePowerOffsetGroupB            ENUMERATED
{ minusinfinity, dB0, dB5, dB8, dB10, dB12, dB15, dB18},
        numberOfRA-PreamblesGroupA          INTEGER (1..64)
    }
                                            OPTIONAL, -- Need R
    ra-ContentionResolutionTimer            ENUMERATED   { sf8,
sf16, sf24, sf32, sf40, sf48, sf56, sf64},
    rsrp-ThresholdSSB                       RSRP-Range
                                    OPTIONAL, -- Need R
    rsrp-ThresholdSSB-SUL                   RSRP-Range
                                    OPTIONAL, -- Cond SUL
    prach-RootSequenceIndex                 CHOICE {
        l839
    INTEGER (0..837),
        l139
    INTEGER (0..137)
    },
    msg1-SubcarrierSpacing                  SubcarrierSpacing,
    restrictedSetConfig                     ENUMERATED
{unrestrictedSet, restrictedSetTypeA, restrictedSetTypeB},
    msg3-transformPrecoding                 ENUMERATED
{enabled}
                                    OPTIONAL, -- Need R
    ...
}
RACH-Additional-ConfigGeneric ::=           SEQUENCE {
    prach-ConfigurationIndex        INTEGER (0..255),
    msg1-FDM                                ENUMERATED
{one, two, four, eight},
    msg1-FrequencyStart                     INTEGER
(0..maxNrofPhysicalResourceBlocks-1),
    zeroCorrelationZoneConfig               INTEGER(0..15),
    preambleReceivedTargetPower             INTEGER (-200..-74),
    preambleTransMax                        ENUMERATED {n3, n4,
n5, n6, n7,  n8, n10, n20, n50, n100, n200},
    powerRampingStep                        ENUMERATED   {dB0,
dB2, dB4, dB6},
    ra-ResponseWindow                       ENUMERATED
{sl1, sl2, sl4, sl8, sl10, sl20, sl40, sl80},
    ...
}
RACH-Additional-ConfigDedicated ::=  SEQUENCE {
    cfra-Resources                          CFRA-Resources,
    cfra-Occasions                          SEQUENCE {
        rach-ConfigCFRA                     RACH-
ConfigGeneric,
        ssb-perRACH-Occasion                ENUMERATED
{oneEighth, oneFourth, oneHalf, one, two, four, eight, sixteen}
    OPTIONAL -- Cond SSB-CFRA
    }                                       OPTIONAL,
                                    -- Need S
    ...
}
CFRA-Resources ::=              CHOICE {
    ssb                                     SEQUENCE {
        ssb-ResourceList                    SEQUENCE
(SIZE(1..maxRA-SSB-Resources)) OF CFRA-SSB-Resource,
        ra-ssb-OccasionMaskIndex     INTEGER (0..15)
    },
    csirs                                   SEQUENCE {
        csirs-ResourceList                  SEQUENCE
(SIZE(1..maxRA-CSIRS-Resources)) OF CFRA-CSIRS-Resource,
        cfra-csirs-DedicatedRACH-Threshold  RSRP-Range
    }
}
CFRA-SSB-Resource ::=           SEQUENCE {
    ssb                                     SSB-Index,
    ra-PreambleIndex                INTEGER (0..63),
    ...
}
CFRA-CSIRS-Resource ::=         SEQUENCE {
    csi-RS                                  CSI-RS-Index,
    ra-OccasionList                         SEQUENCE
(SIZE(1..maxRA-OccasionsPerCSIRS)) OF INTEGER (0..maxRA-Occasions-1),
    ra-PreambleIndex                INTEGER (0..63),
    ...
}
```

Based on the above-described additional information, it can be seen by the UE that information such as frequency information, uplink configuration, SSB position, SSB period, RACH configuration, and the like which are equally and previously transmitted in the downlink and uplink for initial connection are for performing downlink and uplink operations in the corresponding cell simultaneously, and the UE may perform the downlink operation in a cell transmitting the corresponding information with respect to information such as additionally transmitted frequency information, uplink configuration, SSB position, SSB period, RACH configuration, and the like, and may perform the uplink operation in a cell associated with additionally transmitted frequency information, uplink configuration, SSB position and period, and the like.

In order to allow the downlink and the uplink proposed in the disclosure to be operated in different cells, the UE transmits a random access preamble to allocated additionally resources other than RACH resources which are provided to thereby request that the base station performs the downlink operation in the corresponding cell without simultaneously performing the downlink and uplink operations in the corresponding cell and performs the uplink operation in a cell corresponding the transmitted RACH resource. To this end, the RACH resource can be additionally configured as many as the number corresponding to the cell list supported by the base station, and the base station may identify a cell to which the corresponding UE transmits an uplink signal or a transmission and reception point (TRP) according to which resource such random access preamble is received from. At this time, an X2 interface or an optical cable may be connected between the respective TRPs or between a central controller controlling the TRP and the TRP so that each TRP can perform a cooperative operation. Also, each TRP and the central controller may collect the uplink information received from different TRPs to configure or indicate a cell or a TRP that should support the downlink to perform the corresponding downlink operation.

Some pieces of the information shown in Table 18 may be determined to be the same as that of the downlink cell, and in this case, the information may not be transmitted to the UE in duplicate. For example, assuming that prach-ConfigurationIndex is the same, the preamble of the PRACH is used equally, and the time and frequency resources using msg1-FDM and msg1-FrequencyStart can be set differently. Alternatively, it is possible to configure prach-Root Sequence differently while the time and frequency resources are also used equally. At this time, restrictedSetConfig can also use the same set.

Also, the support for the initial connection may be changed depending on the cell implementation type of the base station.

Figure 18A:
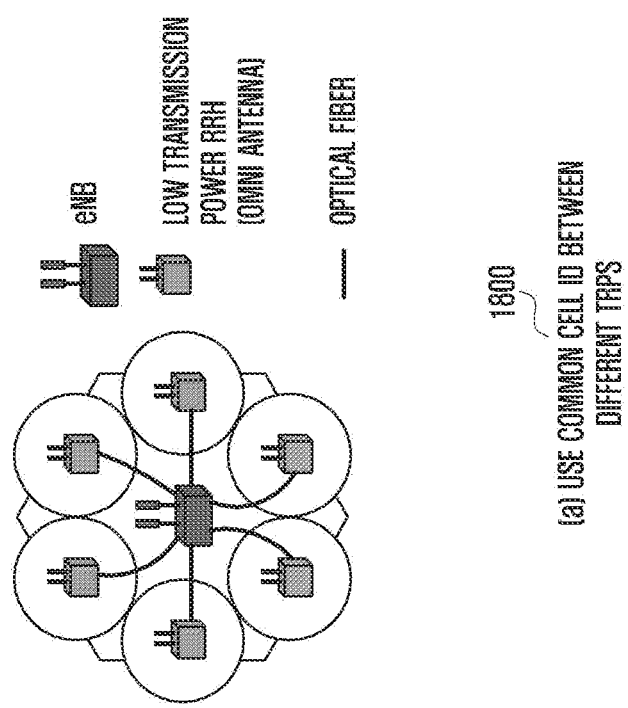
FIG. 18A is a diagram illustrating an available cell implementation type of a base station according to an embodiment of the disclosure.
Figure 18B:
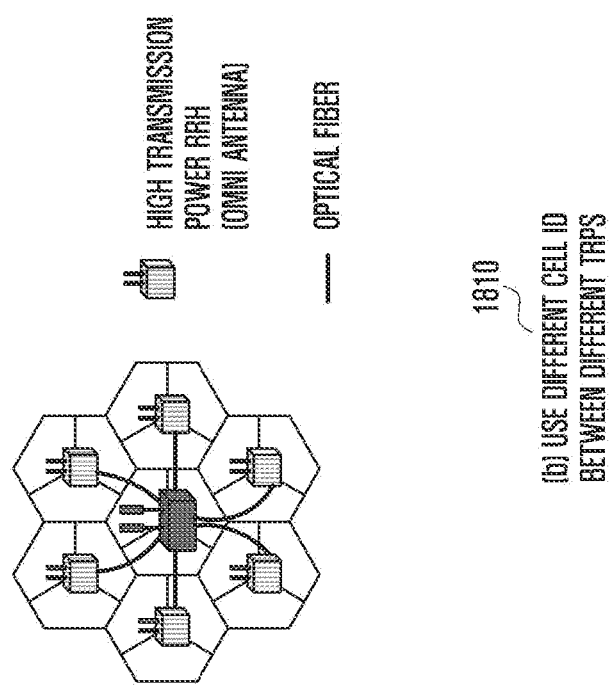
FIG. 18B is a diagram illustrating an available cell implementation type of a base station according to an embodiment of the disclosure.

FIG. 18A is a diagram illustrating an available cell implementation type of a base station according to an embodiment of the disclosure, and FIG. 18B is a diagram illustrating an available cell implementation type of a base station according to an embodiment of the disclosure.

Referring to 1800 of FIG. 18A, a plurality of TRPs operate by sharing a cell ID. In this case, the plurality of TRPs can share a larger amount of the same configuration and information in comparison with a case where they do not share the cell ID. Therefore, only information that is required to be changed can be configured separately. Other information, for example, other than the preamble configuration for other RACH transmission resources, may be shared. In addition, this preamble configuration does not have a new preamble configuration, but can be configured assuming the same sequence, that is, only within a long sequence or a short sequence in which the preamble is the same. At this time, the preamble configuration can be configured as a certain differential value even within the same sequence. For example, if the differential value is 1, the next sequence may be used immediately after the downlink cell (the random access preamble configuration used in the corresponding cell), as the random access preamble transmitted to the uplink cell.

Referring to 1810 of FIG. 18B, a case in which a plurality of TRPs all operate using different cell IDs is shown. In this case, it is necessary to independently configure information on different cells as described in Tables 15, 16, 17 and 18, and the TRPs should operate based on the information.

Assuming the operations of FIGS. 18A and 18B, the base station can transmit a method of operating in the current cell to the UE through an SIB or higher layer signaling. For example, such an operation can be divided into a type A and a type B, or a type I and a type II, and the structure of the additional configuration field described above can be changed according to the configuration.

As described above, when the initial connection is performed by differentiating the uplink and the downlink cells, the UE has to receive the RAR from the cell to which the random access preamble is transmitted in the uplink. However, in the operation proposed by the disclosure, the UE can receive the RAR from the downlink cell (which received the initial connection related information) different from the cell to which the UE transmits the random access preamble in the uplink. Next, scheduled transmission (Msg3) may also be transmitted to the uplink cell and the contention resolution message is received again from the downlink cell. For this operation, the UE can receive a timing advance (TA) value for the uplink cell through the RAR from the downlink cell, and can receive a waveform for transmission of Msg3 to the uplink cell, a subcarrier interval, and a power adjustment value from the downlink cell.

In the above description, the operation when the uplink and downlink cells are different from each other in the initial connection has been proposed, but thereafter, operations for actual downlink data reception and uplink data transmission are proposed.

Figure 19:
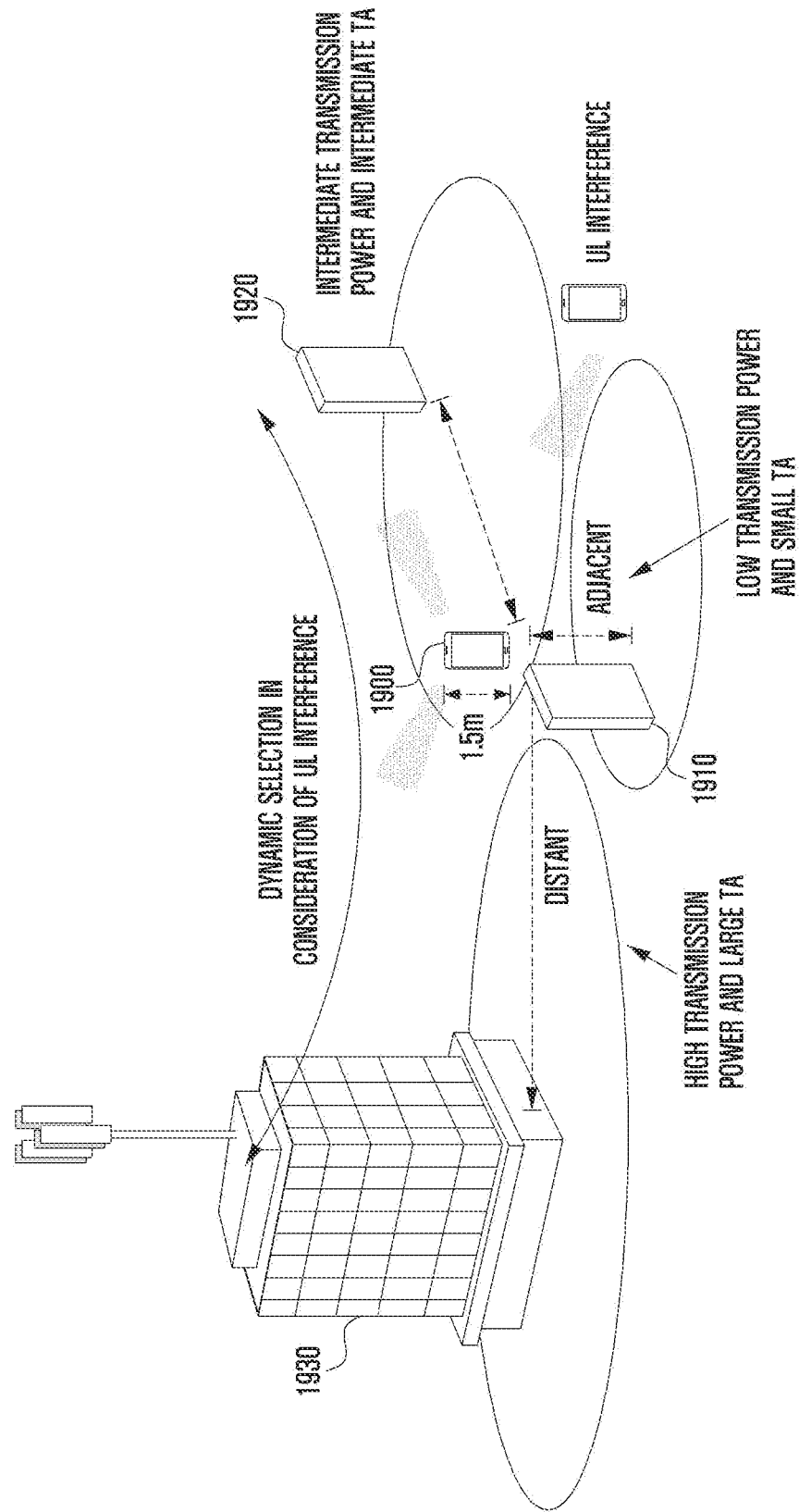
FIG. 19 is a diagram illustrating an example of an operation of dynamically selecting a cell to which uplink data is to be transmitted for uplink transmission according to an embodiment of the disclosure.

FIG. 19 is a diagram illustrating an example of an operation of dynamically selecting a cell to which uplink data is to be transmitted for uplink transmission according to an embodiment of the disclosure.

Referring to FIG. 19, a UE may be located adjacent to several macro cells, femtocells, picocells, and the like. More specifically, the UE 1900 may be adjacent to a macro cell 1930, a picocell 1920, a femtocell 1910, and the like. In this case, the UE can select a cell to which the uplink data is to be transmitted in consideration of uplink interference. The disclosure proposes a method for allowing a UE to transmit data while dynamically exchanging among the macro cell, the femtocell, and the picocell shown in FIG. 19.

Table 19 below shows PUSCH config, which is RRC configuration for PUSCH transmission in an NR.

TABLE 19

| | |
|---|---|
| PUSCH-Config ::= | SEQUENCE { |
| dataScramblingIdentityPUSCH | INTEGER |
| (0..1007) | |

TABLE 19-continued

```
                            OPTIONAL, -- Need M
    txConfig
    ENUMERATED {codebook, nonCodebook}
                                OPTIONAL,  -- Need S
    dmrs-UplinkForPUSCH-MappingTypeA        SetupRelease { DMRS-
UplinkConfig }
        OPTIONAL,           -- Need M
    dmrs-UplinkForPUSCH-MappingTypeB        SetupRelease { DMRS-
UplinkConfig }
        OPTIONAL,           -- Need M
    pusch-PowerControl                              PUSCH-
PowerControl
                            OPTIONAL,  -- Need M
    frequencyHopping                                ENUMERATED
{mode1, mode2}
                           OPTIONAL,  -- Need S
    frequencyHoppingOffsetLists                     SEQUENCE
(SIZE (1..4)) OF INTEGER (1.. maxNrofPhysicalResourceBlocks-1)
    OPTIONAL,  -- Need M
    resourceAllocation                              ENUMERATED
{ resourceAllocationType0, resourceAllocationType1, dynamicSwitch},
    pusch-TimeDomainAllocationList      SetupRelease { PUSCH-
TimeDomainResourceAllocationList }
    OPTIONAL,  -- Need M
    pusch-AggregationFactor                         ENUMERATED
{ n2, n4, n8 }
                OPTIONAL, -- Need S
    mcs-Table
    ENUMERATED {qam256}
                                                    OPTIONAL, --
Need S
    mcs-TableTransformPrecoder                      ENUMERATED
{ qam256}
                    OPTIONAL,  -- Need S
    transformPrecoder                               ENUMERATED
{enabled, disabled}
                    OPTIONAL, -- Need S
    codebookSubset
    ENUMERATED                  {fullyAndPartialAndNonCoherent,
partialAndNonCoherent, nonCoherent},
    maxRank
    INTEGER (1..4),
    rbg-Size
    ENUMERATED { config2}
                                OPTIONAL, -- Need S
    uci-OnPUSCH
    SetupRelease { UCI-OnPUSCH}
                            OPTIONAL, -- Need M
    ...
}
```

In the NR, in order to support uplink transmission to the UE, whether the corresponding transmission is codebook-based transmission or non-codebook-based transmission using TxConfig. Table 20 below shows the RRC configuration for SRS resource set configuration. The base station indicates an SRS resource index (SRI) for analog and/or digital beam indication based on the SRS resource set whose usage is configured as a codebook or a non-codebook among the SRS resource sets configured according to such configuration.

TABLE 20

```
SRS-ResourceSet ::=             SEQUENCE {
    srs-ResourceSetId           SRS-
ResourceSetId,
    srs-ResourceIdList          SEQUENCE
(SIZE(1..maxNrofSRS-ResourcesPerSet)) OF SRS-ResourceId
        OPTIONAL, -- Cond Setup
    resourceType                CHOICE {
        aperiodic
    SEQUENCE {
            aperiodicSRS-ResourceTrigger    INTEGER
(0..maxNrofSRS-TriggerStates-1),
```

TABLE 20-continued

```
    csi-RS
    NZP-CSI-RS-ResourceId
            OPTIONAL, -- Cond NonCodebook
    slotOffset
    INTEGER (1..8)
            OPTIONAL, -- Need S
    ...
    },
    semi-persistent
    SEQUENCE {
        associatedCSI-RS
    NZP-CSI-RS-ResourceId
            OPTIONAL, -- Cond NonCodebook
    ...
    },
    periodic
    SEQUENCE {
        associatedCSI-RS
    NZP-CSI-RS-ResourceId
            OPTIONAL, -- Cond NonCodebook
    ...
    }
    },
```

TABLE 20-continued

```
usage
ENUMERATED    {beamManagement,    codebook,    nonCode-
book,
antennaSwitching},
    alpha                                      Alpha
        OPTIONAL, -- Need S
    p0
    INTEGER (-202..24)
            OPTIONAL, -- Cond Setup
    pathlossReferenceRS                        CHOICE {
        ssb-Index
    SSB-Index,
        csi-RS-Index                           NZP-CSI-
RS-ResourceId
    }
            OPTIONAL, -- Need M
    srs-PowerControlAdjustmentStates           ENUMERATED
{ sameAsFci2, separateClosedLoop}
    OPTIONAL, -- Need S
    ...
}
```

In addition, an MCS table (mcs-table), a codebook subset, a maximum rank (maxrank), a resource block group (RBG) size (rbg-Size), and the like to be used may be configured in the RRC configuration for PUSCH transmission of Table 19.

When the base station transmits the SRI, the number of transmission layers, transmission PMI (TPMI) information, an MCS index, and the like to the UE in the codebook-based transmission based on the RRC field, the UE may transmit uplink data according to the indicated MCS using the number of layers and precoding indicated in the beam based on the transmitted SRI. In contrast, in the non-codebook-based transmission, the base station transmits only the SRI to the UE because the SRS resource in the non-codebook transmission is a resource to which the precoding is always applied in advance and also means one transmission layer. Accordingly, the terminal can acquire transmission layer information and precoding information only by receiving the SRI without transmitting the number of transmission layers or the TPMI information separately. However, this method is a method that is optimized for the small number of analog beams or digital beams so that the corresponding method lacks the flexibility of the instructions to support dynamic switching between small cells such as the macro cell, the picocell, and the nano cell described above.

Therefore, in order to solve this problem, it is possible to support transmission configuration indication (TCI) for indicating a transmission parameter in the uplink. Table 21 below describes an example of the unlink TCI.

TABLE 21

| | Scrambling Identity | TxConfig | DMRS Type | SRS resource/ SS block/ CSI-RS resource | Power control | TA |
|---|---|---|---|---|---|---|
| UL TCI #0 | ID#0 | Codebook based | 1 | SRS #0 | PC #0 | TA #0 |
| UL TCI #1 | ID#1 | Non-codebook based | 2 | SRS #0, SRS #1 | PC #1 | TA #1 |
| UL TCI #2 | ID#2 | Non-codebook based | 1 | SRS #2 | PC #2 | TA #2 |
| UL TCI #3 | ID#3 | Beam diversity | 1 | SRS #3, SRS #4 | PC #3 | TA #3 |
| UL TCI #4 | ID#4 | Codebook based | 1 | SSB #0 | PC #4 | TA #4 |
| UL TCI #5 | ID#5 | Non-codebook based | 2 | SSB #1 | PC #5 | TA #5 |
| UL TCI #6 | ID#6 | Non-codebook based | 2 | CSI-RS #0 | PC #6 | TA #6 |
| UL TCI #7 | ID#7 | Codebook based | 1 | CSI-RS #1 | PC #7 | TA #7 |

As shown in the above Table 21, the base station can configure a plurality of UL TCI configurations for the UE using a higher layer. Based on the configured UL TCI candidates, the base station may indicate, to the UE, TCI configuration that should be used by the UE in actual uplink transmission, using DCI or MAC CE.

This UL TCI configuration may include a scrambling identity for data transmission. The scrambling identifier is an ID for data scrambling and may randomize uplink interference in a method of using a different ID for each cell performing uplink transmission. Accordingly, such an ID can be dynamically selected, thereby improving the uplink transmission performance.

A DMRS type may be configured as such UL TCI configuration. The NR supports two types of DMRSs, and each of the DMRSs has a higher reference signal density to provide higher channel estimation performance or to support a larger number of orthogonal DMRS ports so that each DMRS has different application such as being optimized for multi-user MIMO (MU-MIMO). Accordingly, this DMRS type may be configured differently for each cell according to the situation (for example, type 2 can be configured for a macro cell and type 1 can be configured for a small cell). By dynamically transmitting this information, the uplink transmission performance can be improved. Such a DMRS type may be configured for each PUSCH scheduling type.

The UL TCI configuration may include TxConfig described above for the dynamic change of the uplink transmission technique. The UE may transmit uplink data on the basis of the indicated TxConfig. Also, in this UL TCI configuration, SRS resources or SS blocks or CSI-RS resources can be configured for analog or digital beams. The UE may transmit the uplink data by determining the uplink beam through the SRS, CSI-RS or SSB configured in the indicated UL TCI.

In addition, in the UL TCI, the SRS resources or the SS blocks or the CSI-RS resources may be configured for beam information indication. One or more of these resources may be configured according to a report on whether the UE supports multi-panels. In order to reduce the uplink transmission complexity of the UE in the configuring of a plurality of reference signal resources, the plurality of reference signal resources configured in one UL TCI may be configured to be always unified in the downlink or uplink or configured to the same type of resource. For example, when the plurality of reference signal resources are unified in the downlink, only the CSI-RS and the SSB can be configured, or when the plurality of reference signal resources are unified in the uplink, only the SRS can be configured. Also, it is possible to support constraints such as configuring only the CSI-RS resource even between the downlink reference signals or configuring only the SSB resource. At this time, whether a plurality of panels are supported at the time of uplink transmission may depend on a report on whether the UE supports the panels, or the base station ma directly configure the uplink transmission using the plurality of panels in the RRC. Alternatively, when a plurality of beam information resources are configured in one UL TCI, it can be confirmed that the uplink transmission is required to be performed using the plurality of panels indirectly. Also, if the UE does not support the plurality of panels, the configuration of two or more beam information reference signal resources may not be expected or the beam information reference signal resources after the second beam information reference signal resource may be ignored.

At this time, the SRS resources or the SS blocks or the CSI-RS resources within the UL TCI and an SRI dynamically indicated through the DCI may be simultaneously indicated. In this case, for example, the SRS resources, the SS blocks, and the CSI-RS resources which are indicated through the UL TCI may indicate the analog beam, and the resource indicated through the SRI may indicate the SRS resource to be used for the transmission using digital beam. The presence or absence of this dynamic SRI may vary depending on TxConfig configured in the UL TCI. For example, since the digital precoding and transmission layer may be indicated through the SRI in non-codebook-based transmission, the SRI is required. However, in the codebook-based transmission, the SRI may not be required.

Also, the presence or absence of the dynamic SRI may vary depending on what reference signal resource is configured in the corresponding configuration. For example, when the SSB or the CSI-RS other than the SRS is configured, the UE may obtain beam information through the corresponding resource, but cannot obtain SRS port information or the like for the digital precoding. Accordingly, when the SRS is configured within the UL TCI, the UE may ignore the corresponding information even though a field for the SRI does not exist or the SRI information exists, or the base station may configure the SRI field using specific bits (e.g., 000), or the like. When the CSI-RS or the SSB is configured within the UL TCI, the UE and the base station may use the corresponding field to indicate the SRI.

When the presence or absence of the dynamic SRI varies depending on the UL TCI configuration as described above, the presence or absence of the dynamic SRI may vary depending on whether there is configuration for supporting the dynamic SRI in the corresponding UL TCI. For example, when the presence or absence of the dynamic SRI varies depending on the reference signal configuration (when the CSI-RS or the SSB is configured) or a transmission method (non-codebook-based transmission is configured), the dynamic SRI may exist in the DCI only when the corresponding configuration exists in the UL TCI. When the corresponding configuration does not exist in the UL TCI, the dynamic SRI may not exist in the DCI.

In addition, the UL TCI configuration configured in advance in this manner may include power control information. An alpha, p0, power process, path loss information (pathlossReferenceRS) value, and the like for the corresponding transmission may be configured for each UL TCI field to allow dynamic indication, so that the UE can transmit uplink data in consideration of transmission power that should vary for each of different cells and beams. As described above, when the plurality of CSI-RSs, SSBs, and SRSs are configured for configuring the transmission beam for using the plurality of panels, such power control information or the like may be configured for each reference signal resource used for the power control for each corresponding beam. Equation 1, illustrated in FIG. 26, shows a formula used in uplink power control used in the NR.

The alpha denotes a value of $\alpha_{f,c}(j)$ used in UE power control, and p0 denotes a value of $P_{O\_PUSCH,f,c}$. Also, pathlossReferenceRS is used for configuring a reference signal for calculating a path loss value used in PL ($q_d$) of Equation 1 in FIG. 26, and the power process is a value for indicating another $f_{f,c}(i, 1)$ for power control for each beam at $f_{f,c}(i, 1)$.

Also, the TA values may be different for each UL TCI to dynamically indicate the TA values to be changed for each cell.

Figure 20:
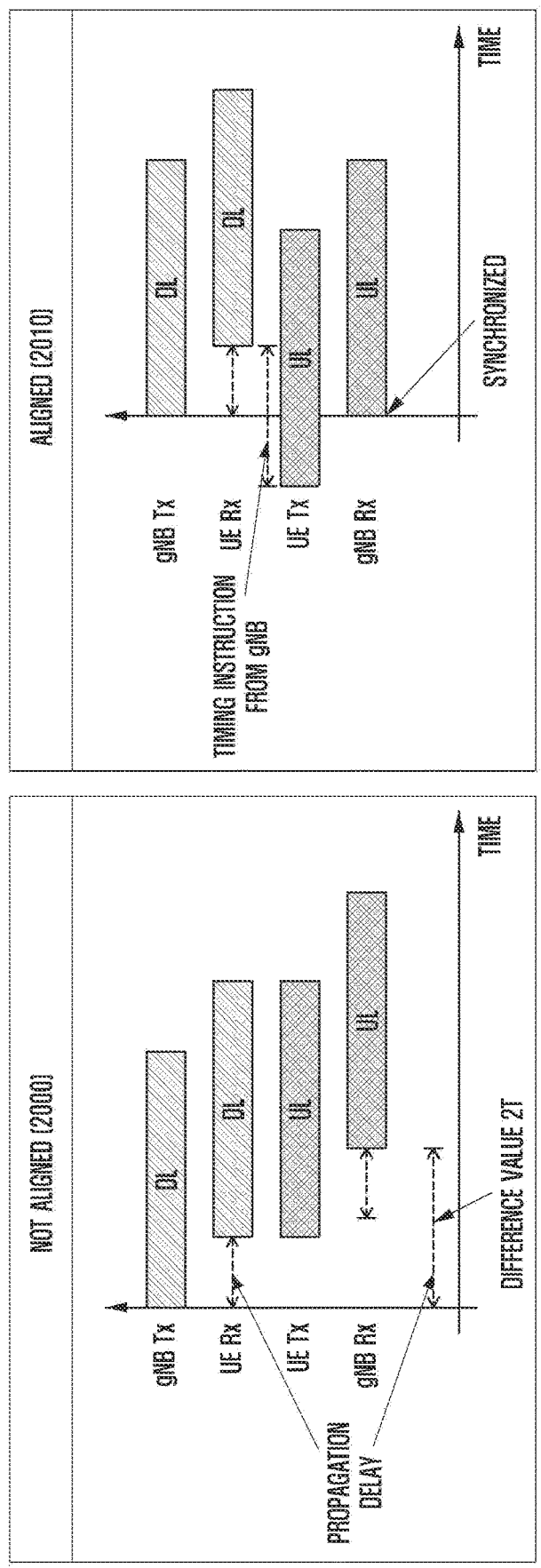
FIG. 20 is a diagram illustrating an example of a timing advance (TA) operation used in LTE and NR according to an embodiment of the disclosure.

FIG. 20 is a diagram illustrating an example of a TA operation used in LTE and NR according to an embodiment of the disclosure.

Referring to 2000 of FIG. 20, when a UE transmits an uplink signal while being synchronized with a downlink, the uplink and the downlink of a base station are not synchronized according to a delay time caused by the propagation time. Since there are several UEs in one cell, if there is no TA, signals transmitted by the base station and the UEs are mixed to cause the occurrence of interference between symbols. Accordingly, in order to establish the synchronization in the wireless system, the base station may configure a TA value considering a cell distance with the UE for each UE to support synchronization between the uplink transmission and the downlink transmission as in 2010. As shown in FIG. 19, since the distances between one UE and several cells are different from each other, the TA value required by the UE may be different for each cell to be transmitted. Therefore, by supporting different TA values for each of these transmission cells, the uplink signal to which the TA value is applied may be supported to be synchronized with the downlink signal of each cell.

The UL TCI may include independent information as mentioned above in a method including the above-mentioned information, but it is also possible to include the PUSCH configuration of Table 19 for each UL TCI configuration.

The UL TCI may be differentiated in the indication method according to the uplink channel. For example, the UL TCI to be used is indicated by the MAC CE for the PUCCH, and the UL TCI is indicated by the DCI for the PUSCH. Also, when the UL TCI is indicated by the DCI, it is possible to activate or deactivate configuration that can be a candidate among the UL TCIs through the MAC CE, and thus the size of the payload of the DCI may vary.

In the above description, suggestion related to the configuration of a plurality of beam indication resources in the UL TCI, which has been mentioned for supporting the plurality of panels can be equally applied to the DL TCI. For example, a beam information resource for a plurality of beam indications (QCL Type-D) can be configured, and only a resource of the same type (for example, SSB or CSI-RS) can be supported.

In the above description, a case in which the transmission power and TA configuration for the transmission to other cells through the UL TCI are changed has been described, but the SRS resource set may be dynamically indicated (for this, an SRS resource set indicator {SRSI} can be used) after a plurality of SRS resource sets are configured, and the SRI may be indicated within the indicated SRS resource set. As described above, since the NR configures the transmission type and transmission power for each SRS resource set, it indicates different transmission power, transmission type, different transmission power and transmission types and beams may be indicated when a different resource set is indicated. Accordingly, it is possible to support different transmission types and transmission power configuration even by indicating the above-mentioned SRSI through the DCI or the MAC CE.

When a UE supports a plurality of panels for the uplink, the SRS resources included in the SRSI can be used according to the support capability of the corresponding UE. For example, if the UE supports two panels and two SRS resources are configured in the SRS resource set, these resources can be interpreted as beam indications for each of the panels of the UE.

Alternatively, the SRSI indicates the SRS resource set of the UE, and the SRI may determine the number of bits of the corresponding SRI field to be supported according to the number of panels in which the SRS resource of the UE is used in the corresponding uplink. For example, if the number of SRS resources in the SRS resource set is N and the number of panels supported according to the supporting capability of the RRC or the UE is L, the number of the corresponding bits may be $_NC_L$. In this case, in order to prevent the number of SRI bits from varying according to the SRSI information, the number of SRI bits may be based on the largest number of SRI bits that need to be supported within the set SRS resource. If the number of SRI bits required in the indicated SRS resource set is small, padding with 0 or 1 for the remaining bits may be supported. Alternatively, when the SRSI is supported, the number of SRS resources (N) in all SRS resource sets and the number of SRS resources to be selected (number of support panels, L) can be made the same so that the corresponding bits can be used efficiently.

At this time, whether the plurality of panels are supported at the time of uplink transmission depends on a report of whether the UE supports the plurality of panels, or the base station indirectly configures the uplink transmission using the plurality of panels in the RRC. Alternatively, when a plurality of beam information resources are configured in the SRSI, it can be seen that the UE should perform uplink transmission using the plurality of panels indirectly. Also, when the UE does not support the plurality of panels, the UE does not expect the configuration of two or more beam information reference signal resources or may ignore beam information reference signal resources after the second beam information reference signal resource.

Also, for a higher flexible operation, the TA and power information of the SRS resource set can be transmitted to the UE via the DCI or the MAC CE. The corresponding alpha, P0, power process, and TA value may be indicated to the UE in order to indicate the power information and the TA information. However, in order to reduce the overhead for transmission and simplify the operation, the configuration shown in Table 22 below can be configured in advance in the RRC by the SRS resource set.

TABLE 22

|   | Power control | TA    |
|---|---------------|-------|
| 0 | PC #0         | TA #0 |
| 1 | PC #1         | TA #1 |
| 2 | PC #2         | TA #2 |
| 3 | PC #3         | TA #3 |
| 4 | PC #4         | TA #4 |
| 5 | PC #5         | TA #5 |
| 6 | PC #6         | TA #6 |
| 7 | PC #7         | TA #7 |

Based on the above configuration, the base station transmits the power information and the TA value via the MAC CE or the DCI, so that the UE can dynamically change the PC value and TA value of the corresponding SRS resource set. For this purpose, the base station can transmit, to the UE, cell ID information, bandwidth part (BWP) ID information, and SRS resource set ID information in order to identify the SRS resource set when transmitting the MAC CE or the DCI to the UE. Also, the dynamic transmission power and TA configuration may vary depending on the transmission type of the SRS resource. For example, in case of aperiodic SRS, transmission to the DCI is allowed, or in case of semi-persistent SRS, it is possible to support both the transmission to the MAC CE or the transmission to the DCI and the MAC CE.

In the above Table 22, both the transmission power and TA are configured and the base station indicates one of them, but only one of the transmission power and the TA may also be configured. The transmission power and the TA may be configured as the corresponding configuration, and the MAC CE or the DCI field for indicating this may respectively exist, thereby supporting the more flexible operation.

Also, since the SRSI requires additional DCI overhead, it is possible to support the activation and deactivation of the MAC CE-based SRS resource set. In this case, the DCI size of the SRSI may vary depending on the total number of activated resources.

In addition, it is possible to support the activation and deactivation of SRS resources using the MAC CE in case that the number of SRS resources for SRI indication increases. In the case of the currently used codebook and non-codebook-based transmission, the payload size for SRI transmission is limited because the SRS resources are supported within a limited number. However, when more uplink beams are used considering multiple TRPs, there is a need to use more SRS resources so that a larger payload for the SRI field is needed. However, since the increase in the size of such a payload can reduce the coverage of the downlink DCI, only a portion of the entirely configured SRS resources may be activated by supporting the activation and deactivation of the SRS resources on the basis of the MAC CE so that such payload overhead can be reduced, and the SRI indicates only the activated SRS resources so that the overhead of the DCI may be reduced and the SRI may be effectively indicated.

Although the SRSI indication is proposed for the uplink operation, a CSI-RS resource set indicator (CRSI) similar to the SRSI may be supported for multi-panel operation in the downlink. In this case, the base station may configure a plurality of CSI-RS resources in the CSI-RS resource set for the multi-beam indication of the base station, may use all the CSI-RS resources configured in the CSI-RS resource set in each panel for the downlink transmission, or may indicate the CSI-RS resource to be used for the downlink transmission using the CRI.

Since the UL TCI or SRSI support mentioned above is different from the existing NR operation, the use of the corresponding operation can be configured through the RRC, and the UE can also report the capability of the operation support to the base station. That is, the UE can report whether the corresponding operation is supported to the base station. In addition, in case of SRSI support, whether a specific SRS resource set is used for the operation as described above can be configured through the RRC. Only when such a field is configured or configured to be used, the corresponding SRS resource set may be used for the SRSI.

Figure 21A:
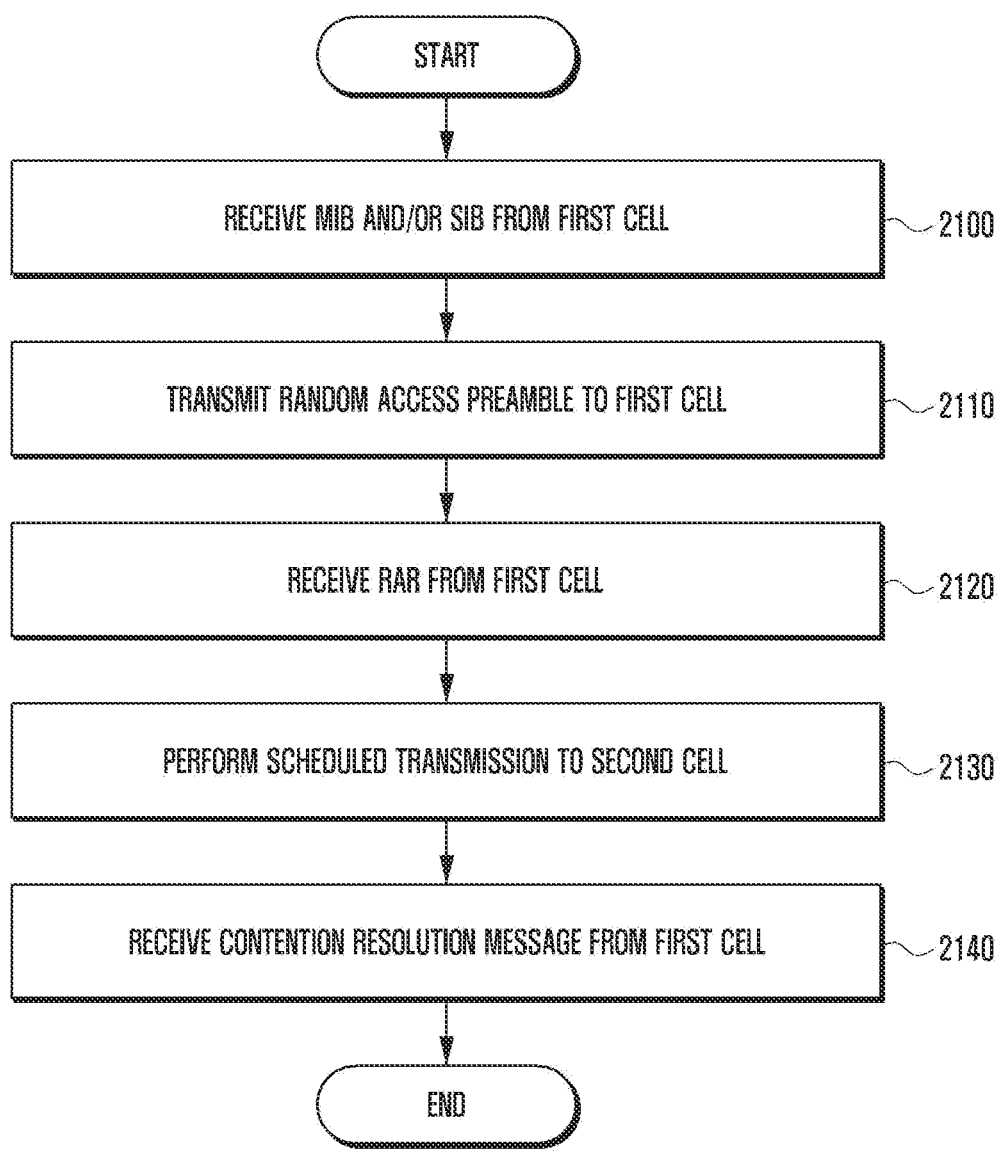
FIG. 21A is a flowchart illustrating the operation of a UE according to an embodiment of the disclosure.
Figure 21B:
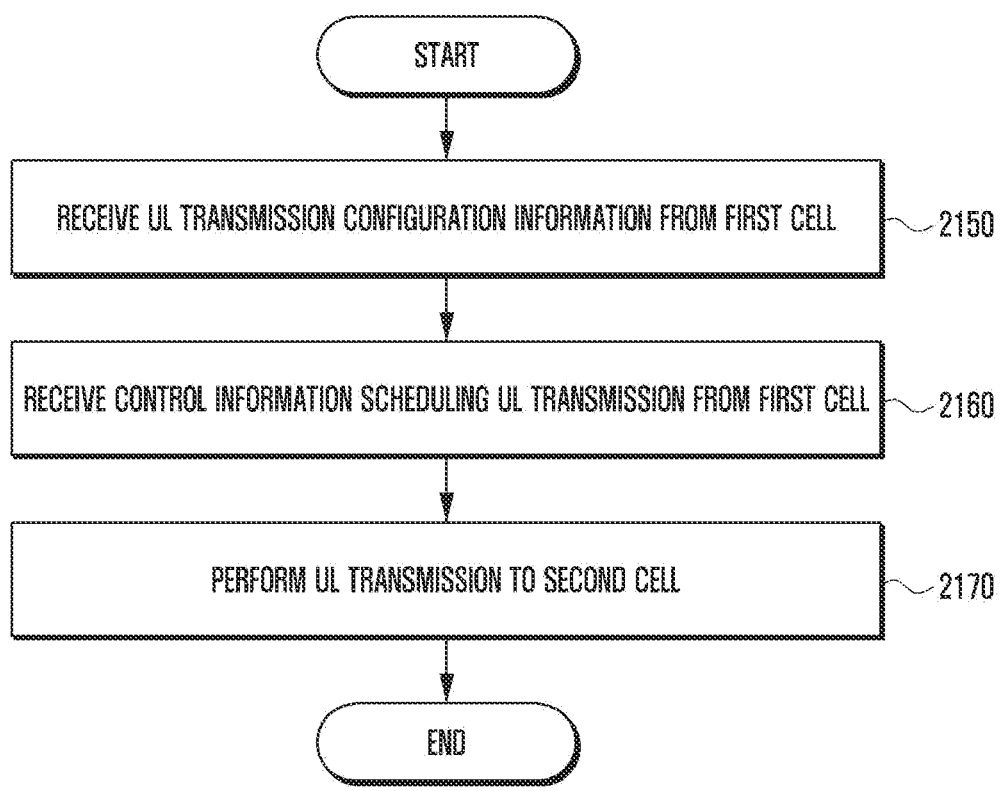
FIG. 21B is a flowchart illustrating the operation of a UE according to an embodiment of the disclosure.

FIG. 21A is a flowchart illustrating the operation of a UE according to an embodiment of the disclosure, and FIG. 21B is a flowchart illustrating the operation of a UE according to an embodiment of the disclosure.

FIG. 21A is a flowchart illustrating the operation of a UE according to an embodiment of the disclosure for initial connection. According to FIG. 21A, the UE receives an SSB from a first cell and identifies an MIB or an SIB through the received SSB in operation 2100. At this time, the first cell may be a macro cell, and the MIB or the SIB may include at least one of information indicating whether the initial connection using another cell in downlink and uplink is supported, a list of an uplink cell capable of performing the above operation in the corresponding cell, transmission power information of a corresponding uplink connectable cell, frequency information of the uplink connectable cell, uplink configuration, SSB-related information such as SSB position and period, and configuration information for RACH transmission. Next, the UE measures the SSB on the basis of the identified information, and identifies pass losses to select a cell having a low path loss as the uplink cell. Next, the UE transmits a random access preamble to the selected cell (second sell) in operation 2110. At this time, the second cell may be a small cell such as a femtocell, a picocell, or the like.

Next, the UE receives an RAR corresponding to the random access preamble transmitted from the first cell in operation 2120. The RAR may include TA information on the uplink cell. The UE identifies the information included in the RAR and transmits Msg 3 (scheduled transmission) to the second cell in operation 2130. Next, the UE receives a contention resolution message from the first cell in operation 2140.

FIG. 21B is a flowchart illustrating the operation of a UE according to an embodiment of the disclosure for data transmission/reception. According to FIG. 21B, the UE receives uplink transmission configuration information from a first cell in operation 2150. The first cell may be a macro cell, and the uplink transmission configuration information may include UL TCI configuration. The UL TCI may include at least one of a scrambling identifier, a DMRS type, TxConfig, SRS resources or SS blocks or CSI-RS resources, power control information, and/or TA information, and/or may include PUSCH-config information (PUSCH configuration information). Alternatively, a plurality of SRS resource sets may be configured. Such a UL TCI or SRS resource set may be configured by the RRC, and a portion configured by the RRC through the MAC CE may be activated or deactivated.

Next, the UE receives uplink transmission scheduling information from the first cell in operation 2160. The scheduling information may be DCI, and the DCI may include an indicator indicating one of the UL TCI configurations and an indicator indicating SRI, SRSI, power and TA information. The DCI may schedule the uplink data transmission. Next, the UE transmits uplink data to a second cell according to the scheduling information in operation 2170.

Figure 22A:
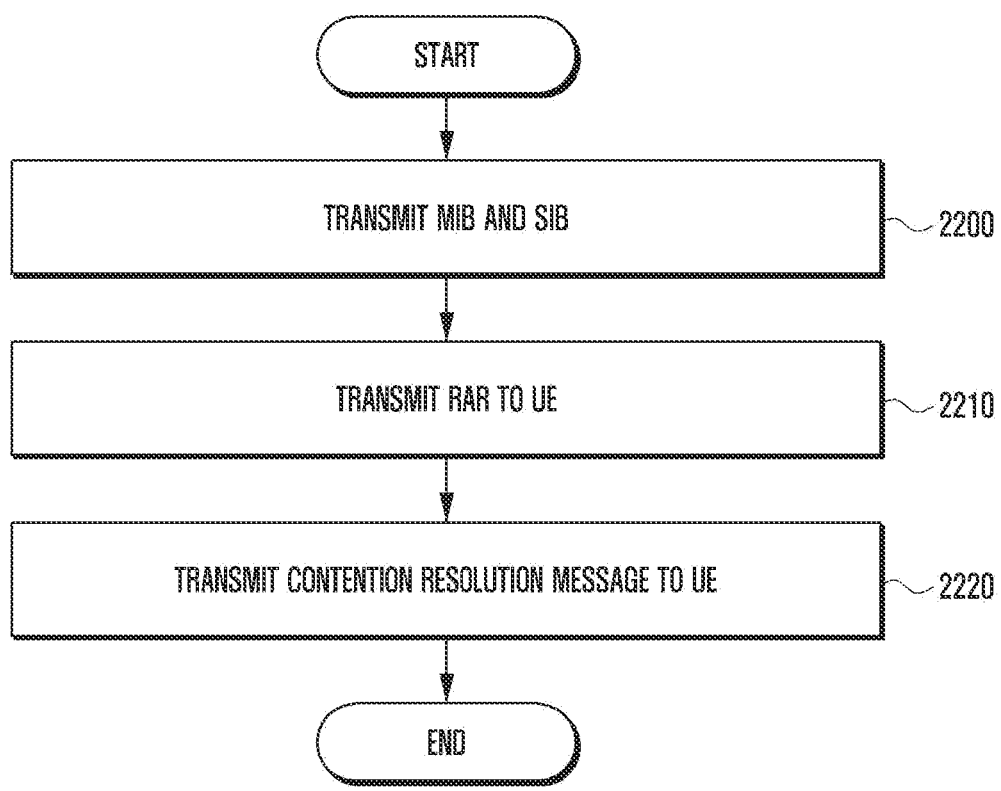
FIG. 22A is a flowchart illustrating the operation of a base station according to an embodiment of the disclosure.
Figure 22B:
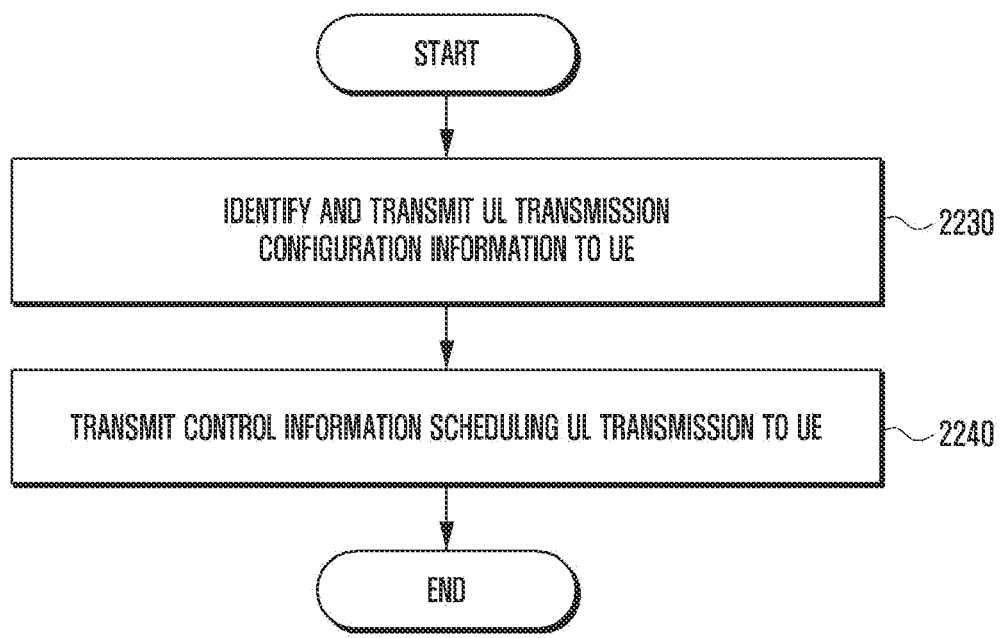
FIG. 22B is a flowchart illustrating the operation of a base station according to an embodiment of the disclosure.

FIG. 22A is a flowchart illustrating the operation of a base station according to an embodiment of the disclosure, and FIG. 22B is a flowchart illustrating the operation of a base station according to an embodiment of the disclosure.

FIG. 22A is a flowchart illustrating the operation of a base station according to an embodiment of the disclosure for initial connection.

Referring to FIG. 22A, the base station transmits an MIB through an SSB, and transmits an SIB in operation 2200. At this time, the base station may be a base station controlling a macro cell. The MIB or the SIB may include at least one of information indicating whether the initial connection using another cell in downlink and uplink is supported, a list of an uplink cell capable of performing the above operation in the corresponding cell, transmission power information of a corresponding uplink connectable cell, frequency information of the uplink connectable cell, uplink configuration, SSB-related information such as SSB position and period, and configuration information for RACH transmission. Next, the base station receives information related to a random access preamble from a base station controlling a second cell that receives a random access preamble transmitted by a UE.

Next, the base station generates and transmits an RAR corresponding to the random access preamble to the UE in operation 2210. The RAR may include TA information about the second cell. Next, the base station receives Msg 3-related information transmitted by the UE, from the base station controlling the second cell. Accordingly, the base station transmits a contention resolution message to the UE in operation 2220.

FIG. 22B is a flowchart illustrating the operation of a base station according to an embodiment of the disclosure for data transmission/reception. Referring to FIG. 22B, the base station transmits uplink transmission configuration information to the UE in operation 2230. At this time, the base station may be a base station controlling the macro cell. The uplink transmission configuration information may include UL TCI configuration, and the UL TCI may include at least one of a scrambling identifier, a DMRS type, TxConfig, SRS resource or SS block or CSI-RS resource, and power control information and/or TA information, or/and may include PUSCH-config information (PUSCH configuration information). Alternatively, a plurality of SRS resource sets may be configured. Such a UL TCI or SRS resource set may be configured by the RRC, and a portion configured by the RRC through the MAC CE may be activated or deactivated.

Next, the base station receives uplink transmission scheduling information from the UE in operation 2240. The scheduling information may be DCI, and the DCI may include an indicator indicating one of the UL TCI configurations and an indicator indicating SRI, SRSI, power and TA information. The DCI may schedule the uplink data transmission. Next, the base station receives the result of the uplink data transmission according to the scheduling information of the UE from the base station that has received the uplink data transmission.

Figure 23:
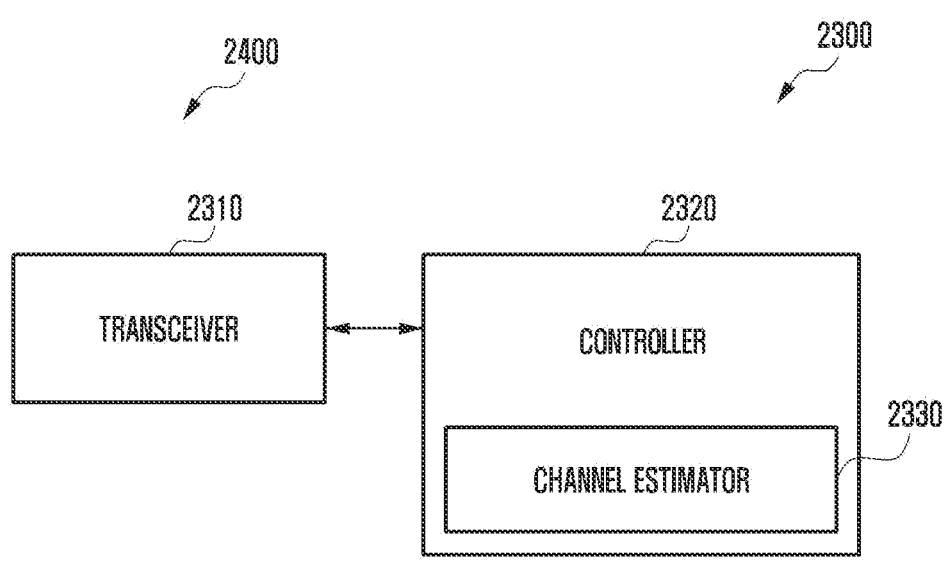
FIG. 23 is a block diagram illustrating an internal structure of a UE according to an embodiment of the disclosure.

FIG. 23 is a block diagram illustrating an internal structure of a UE according to an embodiment of the disclosure.

Referring to FIG. 23, a UE 2300 includes a transceiver 2310 and a controller 2320. The transceiver 2310 performs a function of transmitting or receiving data from the outside (e.g., a base station). Here, the transceiver 2310 may transmit feedback information to the base station under the control of the controller 2320. The controller 2320 controls the states and operations of all components constituting the UE. Specifically, the controller 2320 generates the feedback information according to information allocated from the base station. Also, the controller 2320 controls the transceiver 2310 to feed back the generated channel information to the base station according to timing information allocated from the base station. To this end, the controller 2320 may include a channel estimator 2330. The channel estimator 2320 determines the position in time and frequency resources of the corresponding resource through the service and feedback information received from the base station, and identifies the required feedback information through CSI-RS and feedback allocation information associated with the determination. The corresponding channel is estimated using the received CSI-RS on the basis of the feedback information.

In FIG. 23, an example in which the UE includes the transceiver 2310 and the controller 2320 has been described, but the UE may further include various components according to the function performed in the UE without being limited thereto. For example, the UE may further include a display unit for displaying the current status of the UE, an input unit for inputting signals related to function performance from a user, a storage unit for storing generated data in the UE, and the like. Also, in the above description, the channel estimator 2330 is illustrated as being included in the controller 2320, but is not necessarily limited thereto.

Also, the controller 2320 may receive an MIB and an SIB from the base station, and may control the transceiver 2310 to perform an initial connection procedure on the basis of the information. Also, for this purpose, the controller 2320 may control the transceiver 2310 to measure at least one SSB, and may determine an uplink cell according to the measurement result. Also, the control information may control the transceiver 2310 to receive uplink configuration information and scheduling information from the base station, and may control the transceiver 2310 to perform uplink transmission according to the configuration information and the scheduling information.

Figure 24:
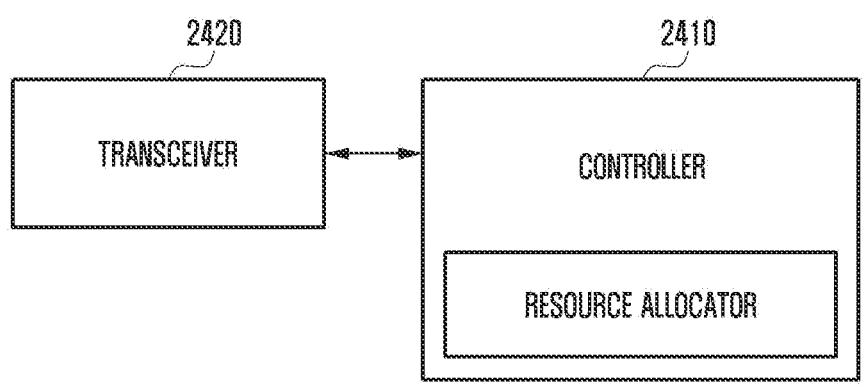
FIG. 24 is a block diagram illustrating an internal structure of a base station according to an embodiment of the disclosure.

FIG. 24 is a block diagram illustrating an internal structure of a base station according to an embodiment of the disclosure.

Referring to FIG. 24, a base station 2400 includes a controller 2410 and a transceiver 2420. The controller 2410 controls the states and operations of all components constituting the base station. Specifically, the controller 2410 allocates, to a UE, CSI-RS resources for related configuration for the UE to acquire resource information and channel estimation, and allocates feedback resources and feedback timing to the UE. To this end, the controller 2410 may further include a resource allocator 2430. Also, the controller 2410 allocates the feedback configuration and the feedback timing to prevent the collision between the feedback from several UEs, and receives and interprets feedback information configured at the corresponding timing. The transceiver 2420 performs a function of transmitting/receiving data, a reference signal, and feedback information to/from the UE. Here, the transceiver 2420 transmits a CSI-RS to the UE through resources allocated under the control of the controller 2410, and receives feedback about channel information from the UE. In the above description, the resource allocator 2430 is illustrated as being included in the controller 2410, but is not necessarily limited thereto.

Also, the controller 2410 may transmit an MIB through the SSB, and may control the transceiver 2420 to transmit the SIB thereafter. Also, the controller 2410 may control the transceiver 2420 to generate an RAR and a contention resolution message and to transmit the message to the UE. Alternatively, the controller 2410 may receive a random access preamble and may control the transceiver 2420 to receive Msg3. Also, the controller 2410 may control the transceiver 2420 to transmit uplink transmission configuration information and scheduling information to the UE. Alternatively, the controller 2410 may control the transceiver 2420 to receive uplink data from the UE. Also, although not shown, the base station may be connected to an adjacent base station by backhaul, and may transmit and receive information related to the initial connection and data transmission to and from other base stations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:
   identifying at least one of a master information block (MIB) or a system information block (SIB) transmitted from a first base station, wherein at least one of the MIB or the SIB includes configuration information on an initial access to a second base station, and wherein the configuration information includes information on a transmit power of a synchronization signal block (SSB) of a second cell, uplink configuration information for the second cell, and random access channel configuration information for the second cell;
   obtaining a path loss of the SSB of the second cell based on the information on the transmit power of the SSB;
   identifying the second cell controlled by the second base station for transmitting a random access preamble on a random access channel based on the obtained path-loss;
   transmitting the random access preamble on the random access channel to the second base station;
   receiving a random access response (RAR) in response to the random access preamble from the first base station; and
   performing a scheduled transmission to the second base station.

2. The method of claim 1, further comprising:
   receiving a contention resolution message from the first base station.

3. The method of claim 1, further comprising:
   receiving configuration information on uplink transmission from the first base station,
   wherein the configuration information on the uplink transmission includes uplink transmission configuration indication (UL TCI) configuration information including a plurality of UL TCI configurations.

4. The method of claim 3, further comprising:
   receiving uplink data scheduling information including an UL TCI from the first base station, the UL TCI indicating at least one UL TCI configuration among the plurality of UL TCI configurations; and
   transmitting uplink data to the second base station based on the uplink data scheduling information,
   wherein an uplink beam for the uplink data is identified based on the UL TCI.

5. The method of claim 3, further comprising:
   transmitting capability information indicating whether to support of UL TCI configuration to the first base station.

6. A method of a first base station in a wireless communication system, the method comprising:
   identifying a second cell controlled by a second base station for transmitting a random access preamble on a random access channel by a terminal;
   transmitting a master information block (MIB) or a system information block (SIB) to the terminal, wherein at least one of the MIB or the SIB includes configuration information on an initial access to the second base station, and wherein the configuration information includes information on a transmit power of a synchronization signal block (SSB) of the second cell, uplink configuration information for the second cell, and random access channel configuration information for the second cell;
identifying the random access preamble transmitted by the terminal to the second base station; and
transmitting a random access response (RAR) in response to the random access preamble to the terminal.

7. The method of claim 6, further comprising:
transmitting configuration information on uplink transmission from the first base station,
wherein the configuration information on uplink transmission includes uplink transmission configuration indication (UL TCI) configuration information including a plurality of UL TCI configurations.

8. The method of claim 7, further comprising:
transmitting uplink data scheduling information including an UL TCI from the first base station, the UL TCI indicating at least one UL TCI configuration among the plurality of UL TCI configurations,
wherein uplink data to the second base station is transmitted based on the uplink data scheduling information, and
wherein an uplink beam for the uplink data is identified based on the UL TCI.

9. The method of claim 7, further comprising:
receiving capability information indicating whether an UL TCI configuration is supported from the terminal.

10. A terminal in a wireless communication system, the terminal comprising:
a transceiver; and
a controller coupled with the transceiver and configured to:
identify at least one of a master information block (MIB) or a system information block (SIB) transmitted from a first base station, wherein at least one of the MIB or the SIB includes configuration information on an initial access to a second base station, and wherein the configuration information includes information on a transmit power of a synchronization signal block (SSB) of a second cell, uplink configuration information for the second cell, and random access channel configuration information for the second cell,
obtain a path loss of the SSB of the second cell based on the information on the transmit power of the SSB,
identify the second cell controlled by the second base station for transmitting a random access preamble on a random access channel based on the obtained path-loss,
transmit the random access preamble on the random access channel to the second base station,
receive a random access response (RAR) in response to the random access preamble from the first base station, and
perform a scheduled transmission to the second base station.

11. The terminal of claim 10, wherein the controller is further configured to:
receive a contention resolution message from the first base station.

12. The terminal of claim 10,
wherein the controller is further configured to receive configuration information on uplink transmission from the first base station, and
wherein the configuration information on the uplink transmission includes uplink transmission configuration indication (UL TCI) configuration information including a plurality of UL TCI configurations.

13. The terminal of claim 12,
wherein the controller is further configured to:
receive uplink data scheduling information including an UL TCI from the first base station, the UL TCI indicating at least one UL TCI configuration among the plurality of UL TCI configurations, and
transmit uplink data to the second base station based on the uplink data scheduling information, and
wherein an uplink beam for the uplink data is identified based on the UL TCI.

14. The terminal of claim 12, wherein the controller is further configured to transmit capability information indicating whether to support of UL TCI configuration to the first base station.

15. A first base station in a wireless communication system, the first base station comprising:
a transceiver; and
a controller coupled with the transceiver and configured to:
identify a second cell controlled by a second base station for transmitting a random access preamble on a random access channel by a terminal,
transmit a master information block (MIB) or a system information block (SIB) to the terminal, wherein at least one of the MIB or the SIB includes configuration information on an initial access to the second base station, and wherein the configuration information includes information on a transmit power of a synchronization signal block (SSB) of the second cell, uplink configuration information for the second cell, and random access channel configuration information for the second cell,
identify the random access preamble transmitted by the terminal to the second base station, and
transmit a random access response (RAR) in response to the random access preamble to the terminal.

16. The first base station of claim 15,
wherein the controller is further configured to transmit configuration information on uplink transmission from the first base station, and
wherein the configuration information on the uplink transmission includes uplink transmission configuration indication (UL TCI) configuration information including a plurality of UL TCI configurations.

17. The first base station of claim 16,
wherein the controller is further configured to transmit uplink data scheduling information including an UL TCI from the first base station, the UL TCI indicating at least one UL TCI configuration among the plurality of UL TCI configurations,
wherein uplink data to the second base station is transmitted based on the uplink data scheduling information, and
wherein an uplink beam for the uplink data is identified based on the UL TCI.

18. The first base station of claim 16, wherein the controller is further configured to receive capability information indicating whether an UL TCI configuration is supported from the terminal.

19. The method of claim 6, further comprising:
transmitting a contention resolution message to the terminal.

20. The first base station of claim 15, wherein the controller is further configured to:
transmit a contention resolution message to the terminal.

* * * * *